United States Patent [19]

Parsons et al.

[11] Patent Number: 5,379,229
[45] Date of Patent: Jan. 3, 1995

[54] AUTOMATED STORAGE AND RETRIEVAL SYSTEM

[75] Inventors: Donald F. Parsons, West Chester; Kyle Gress, Denver; James M. Dempsey, Phoenixville; Joseph Ross, Downington; William Parsons, Boothwyn; Stephen Parsons, Devon, all of Pa.

[73] Assignee: Communications Test Design, Inc., West Chester, Pa.

[21] Appl. No.: 900,964

[22] Filed: Jun. 18, 1992

[51] Int. Cl.⁶ .................... G06F 15/46; B65G 1/00
[52] U.S. Cl. ..................... 364/478; 414/273; 414/279
[58] Field of Search ............. 364/478, 479; 414/273, 414/274, 277, 278, 279, 280, 281, 284, 331; 235/383, 385; 198/604

[56] References Cited

U.S. PATENT DOCUMENTS

| | | |
|---|---|---|
| 3,536,194 | 10/1970 | Novak . |
| 3,697,680 | 10/1972 | Anstin . |
| 3,738,506 | 6/1973 | Cornford et al. . |
| 3,920,195 | 11/1975 | Sills et al. . |
| 4,007,843 | 2/1977 | Lubbers et al. . |
| 4,195,347 | 3/1980 | MacMunn et al. ............ 364/478 |
| 4,219,296 | 8/1980 | Fujii et al. . |
| 4,428,708 | 1/1984 | Burt ............ 414/275 |
| 4,673,932 | 6/1987 | Ekchian et al. . |
| 4,786,229 | 11/1988 | Henderson ............ 414/274 |
| 4,804,307 | 2/1989 | Motoda . |
| 4,824,311 | 4/1989 | Mims . |
| 4,837,704 | 6/1989 | Lengefeld . |
| 4,846,620 | 7/1989 | Mims . |
| 4,860,876 | 8/1989 | Moore et al. . |
| 4,896,024 | 1/1990 | Morello et al. . |
| 4,903,815 | 2/1990 | Hirschfeld et al. . |
| 4,974,166 | 11/1990 | Maney et al. . |
| 5,002,449 | 3/1991 | Kita et al. . |
| 5,006,996 | 4/1991 | Nakamura et al. . |
| 5,020,958 | 6/1991 | Tuttobene . |
| 5,024,572 | 6/1991 | Tanaka et al. . |
| 5,147,176 | 9/1992 | Stolzer et al. ............ 414/273 |
| 5,163,802 | 11/1992 | Poinelli ............ 364/478 |
| 5,174,454 | 12/1992 | Parkander ............ 364/478 |
| 5,175,690 | 12/1992 | Berthier et al. ............ 364/478 |
| 5,226,782 | 7/1993 | Rigling ............ 414/273 |

Primary Examiner—Jerry Smith
Assistant Examiner—Thomas E. Brown
Attorney, Agent, or Firm—Ratner & Prestia

[57] ABSTRACT

An automated system for storing and retrieving objects from multiple object categories. A plurality of storage rack assemblies is included. Each storage rack assembly has a plurality of slots sized for storing objects. A storage transport is movable alongside each respective storage rack assembly for positioning adjacent any slot. A plurality of horizontal tracks are arranged to be perpendicular to the storage rack assemblies. Each storage rack assembly has an end adjacent the tracks. A runner transport is coupled to and movable on each track for receiving one of the objects from, or providing one of the objects to a storage transport. Two conveyor rack assemblies are located at opposite ends of the tracks, aligned perpendicularly to the track. Conveyor transports are adjacent the conveyor rack assemblies for transferring objects between the conveyor rack assembly and the runner transports. Storage and retrieval operation requests are generated by simultaneously providing positioning signals to a conveyor transport, a runner transport and a storage transport. Storage transports are selected in accordance with a predetermined transport selection function. Storage slots are selected in accordance with a predetermined slot selection function. A database stores the category, age and location of each of the objects.

17 Claims, 16 Drawing Sheets

Microfiche Appendix Included
(5 Microfiche, 239 Pages)

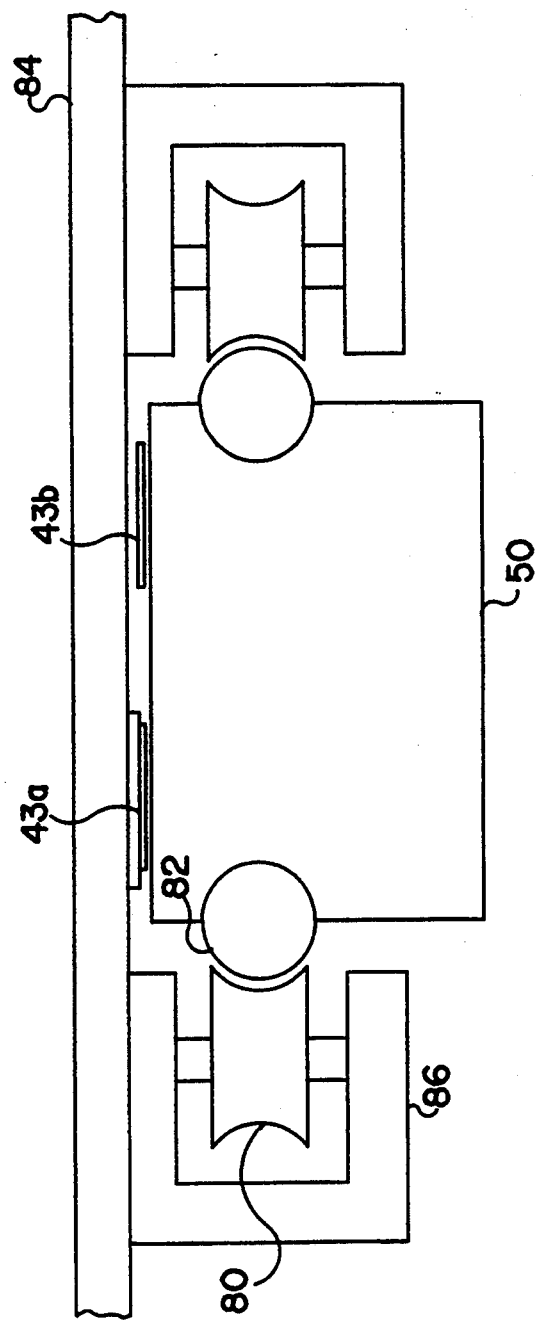

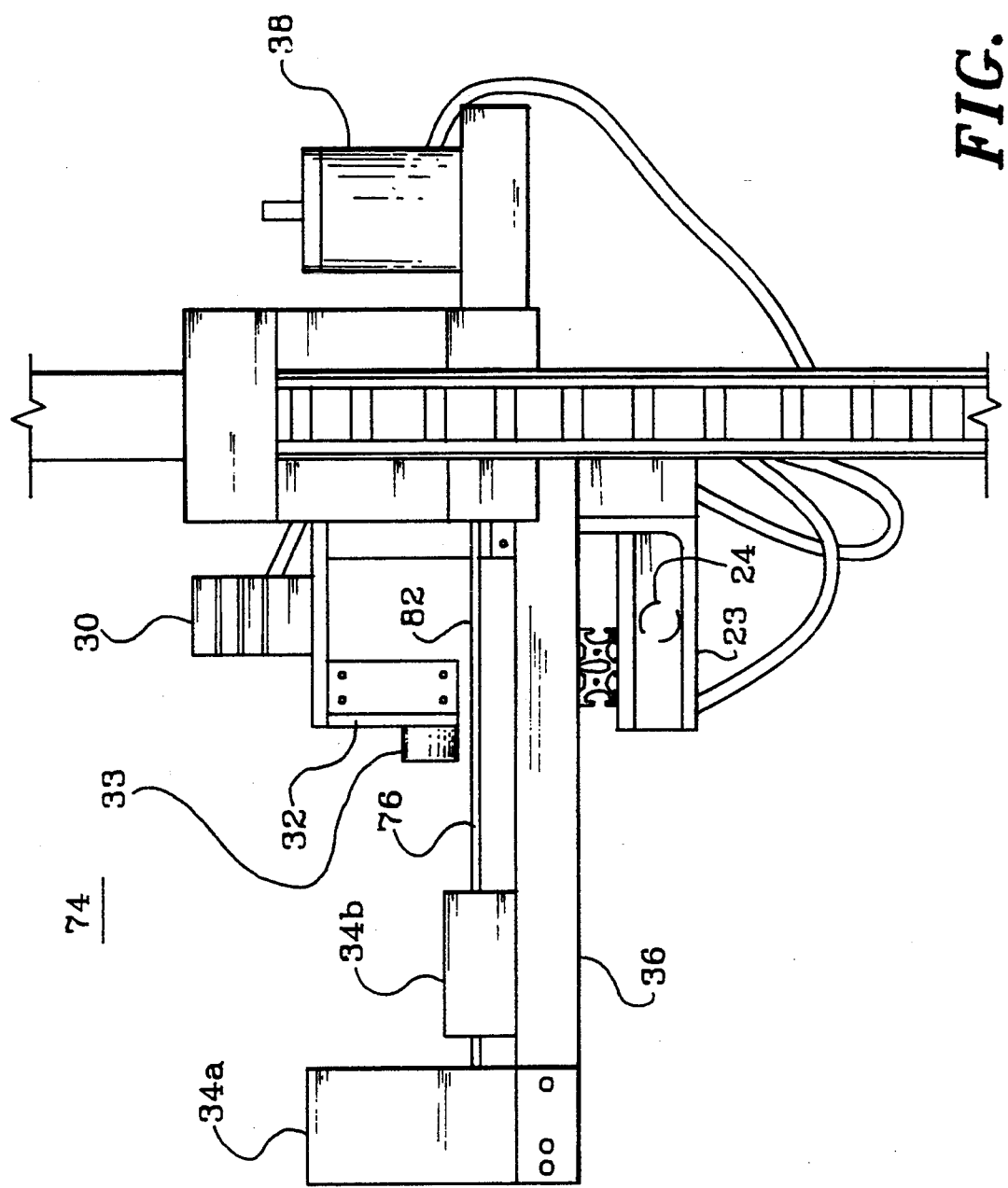

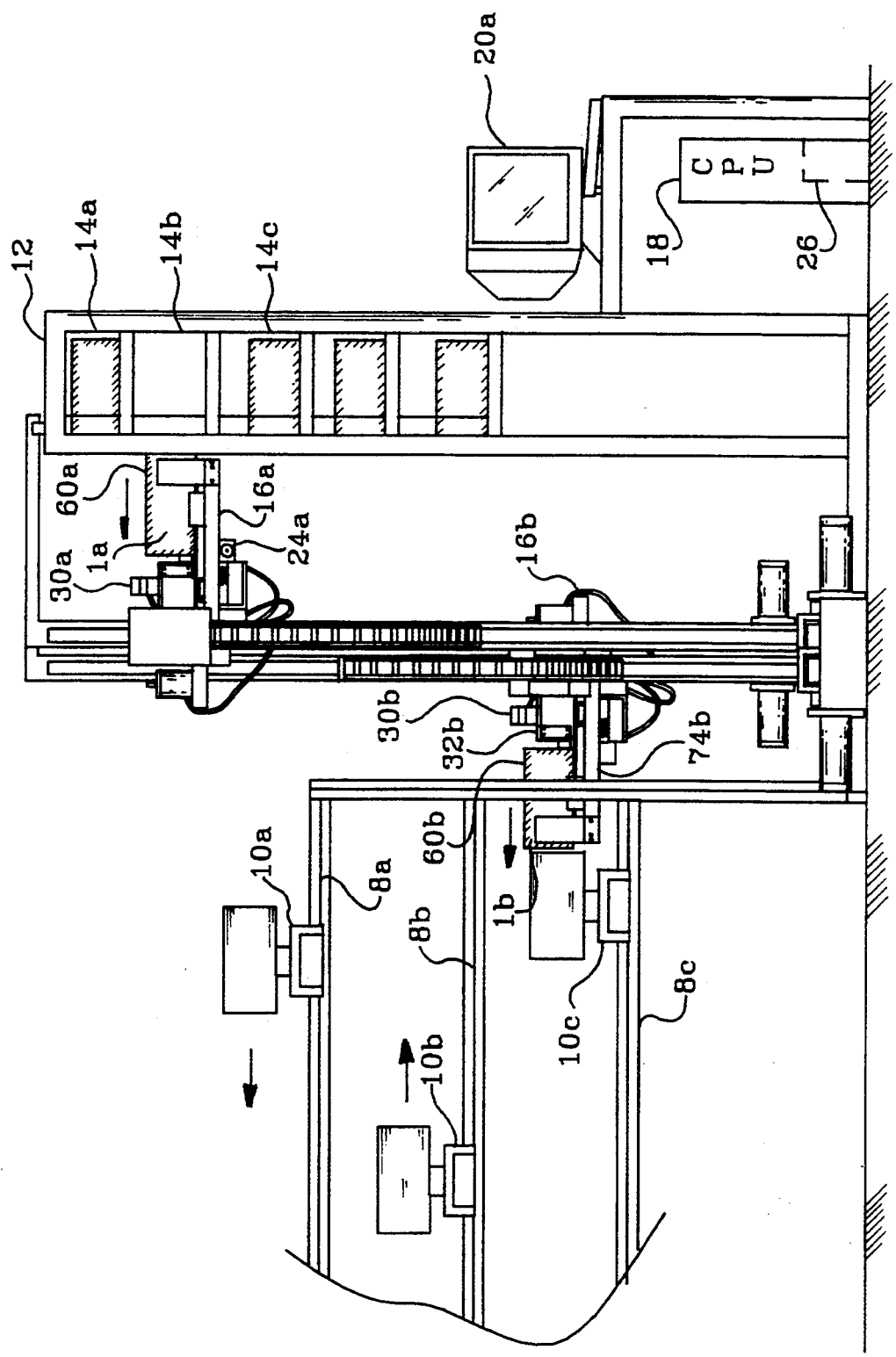

1

AUTOMATED STORAGE AND RETRIEVAL SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A microfiche appendix is included in this application containing 5 microfiche. Each microfiche, numbered one to 1 to 5, contains 48 frames plus one test target frame, for a total of 49 frames per microfiche. The last microfiche, numbered 5, contains 42 frames plus one test target frame for a total of 43 frames.

BACKGROUND OF THE INVENTION

1. Field of the Invention

The present invention relates generally to the field of automated storage and retrieval systems, in particular to systems which store and retrieve objects with a high transaction frequency.

2. Description of the Related Art

Automated storage systems have been used to increase productivity by reducing the number of workers needed to store and retrieve objects. Automated systems offer improved accuracy and reliability over manual systems, which are subject to human errors.

The speed of storage and retrieval operations is often critical to the success of an automated system. This is particularly the case when the system includes a large number of separate storage racks serviced by multiple mechanical transports. The use of minimal personnel in the system makes it desirable to include a rapid automated system for transferring objects between the shipping/receiving area and any of the storage racks.

Several previous attempts have been made to increase the speed of delivery between the shipping/receiving area and the ultimate slot in which an object is stored. U.S. Pat. No. 3,738,506 to Cornford shows multiple transports simultaneously storing and retrieving objects. Cornford includes two transports, one for storage and one for retrieval. Each transport moves an elevator to the row in which the desired slot is located. A self-propelled satellite transport is released from the elevator to move along the row to the desired slot to store/retrieve the object.

The method for selecting storage locations at the time of storage is just as important as the speed of the mechanical transports used in order to enhance the speed of subsequent retrieval operations. In previous systems, storage locations were either selected based on predetermined assignments, or the objects were placed in the closest location to the receiving station. Neither of these methods provides the fastest total storage or retrieval time when multiple transports are available to perform storage and retrieval operations, and shipping orders require more than one of the same item.

Another concern with automated systems is inventory turnover. If every item is stored in the nearest storage location to the receiving station, and objects are also retrieved from the nearest location, then inventory will turn over in a last-in, first-out fashion. If a first-in, first-out method is desired to limit the age of the oldest items in stock, then an increase in retrieval time will be experienced.

U.S. Pat. No. 5,002,449 to Kita discloses multiple transports which are simultaneously and independently dispatched to fetch or return objects. Inner pickers (transports) each move within a single row (only horizontally) and transfer the objects to/from an outer picker which travels vertically between the inner pickers and a conveyor. Since the inner pickers are each assigned to a single horizontal row, collisions are avoided. Objects are either stored at fixed addresses, or are stored in a location which minimizes the travel distance of the inner picker during storage.

Another area of concern for warehousing systems is the use of a method for facilitating collection and ensuring the integrity of inventory data. U.S. Pat. No. 5,006,996 to Nakamura shows a storage system using forklifts in which the address of the slot is checked prior to storing or retrieving an object. Nakamura includes the process of checking the slot before storage and performing an inventory. When an inventory of the stored objects is desired, the identification from each stored object is read and transmitted to a data processing unit for comparison with the previously recorded inventory data.

SUMMARY OF THE INVENTION

The present invention is embodied in an automated system for storing and retrieving objects which are assigned to object categories.

A plurality of storage rack assemblies is included, each storage rack assembly having at least one storage rack, each storage rack having a plurality of slots sized for storing the objects.

The system includes means for generating storage operation requests and retrieval operation requests. Control means responsive to said storage operation requests and retrieval operation requests select one of the storage rack assemblies into which a respective object is stored to distribute objects assigned to any one object category uniformly among each of the storage rack assemblies.

A plurality of independently movable storage transports are included, each storage transport movable adjacent a respective one storage rack assembly to transfer an object to any one of the slots in that respective storage rack assembly. The storage transports are also movable for retrieving an object from any one of the slots in that respective storage rack assembly. Each storage transport includes object handling means for receiving, holding and delivering one of the objects. The storage transports store the objects in their respective storage rack assemblies.

A plurality of independently movable runner transports deliver objects to the plurality of storage transports and receive objects from the plurality of storage transports. Each of the runner transports includes means for holding one of the objects. Respective runner transports provide respective objects to, and receive objects from, their respective storage transports.

BRIEF DESCRIPTION OF THE DRAWINGS

FIG. 3b sectional view taken across section 1—1 of FIG. 3a.

FIG. 3c is an elevation view of the object handling assembly within the storage transport shown in FIG. 3a.

FIG. 4d shows the operator station, conveyor transports and runner transports from the system shown in FIG. 1.

DETAILED DESCRIPTION OF THE INVENTION

OVERVIEW

Figure 1:
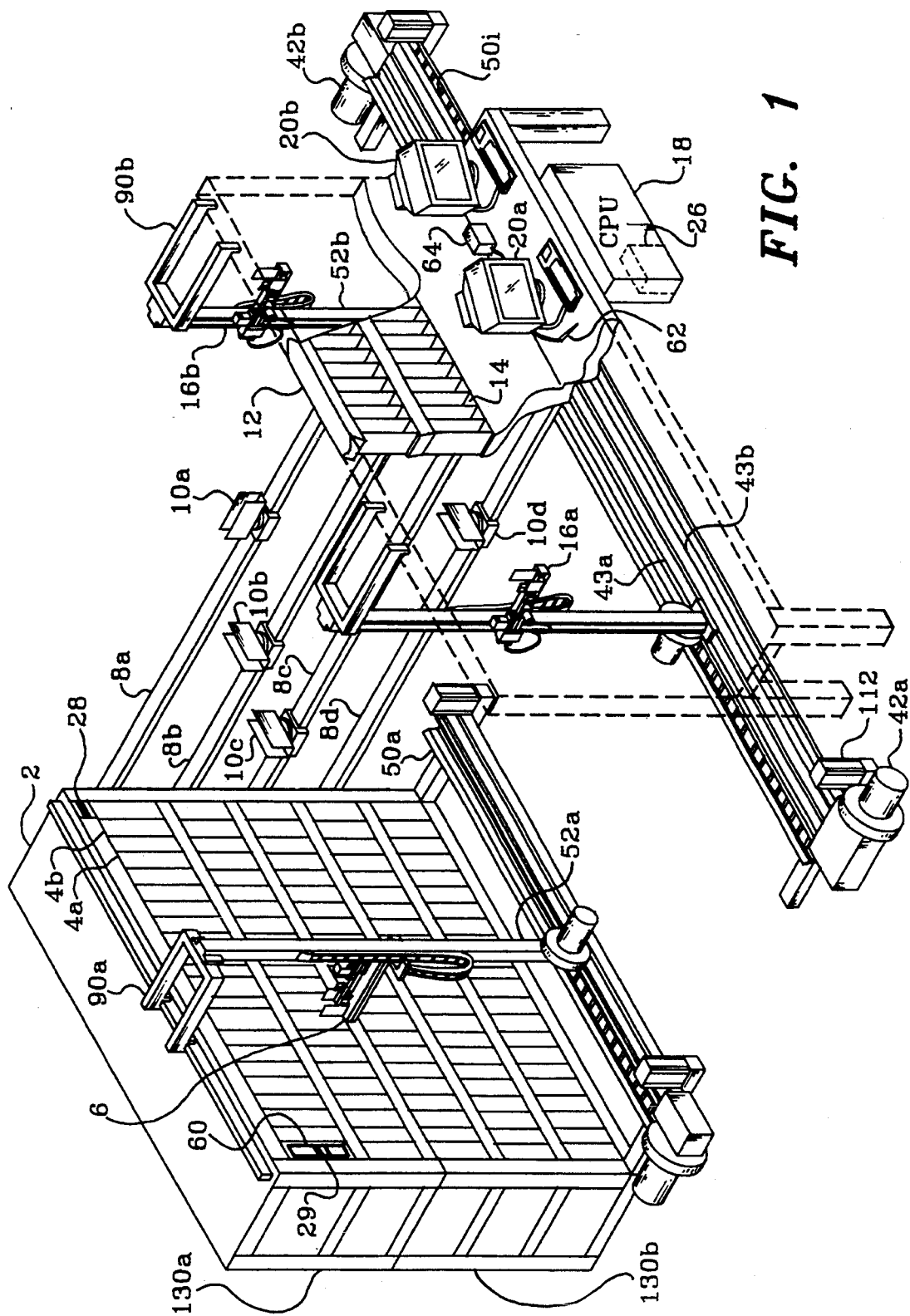
FIG. 1 is a perspective view of an exemplary automated storage and retrieval system.

FIG. 1 shows an exemplary system in accordance with the invention. Each object 1 is placed inside a case 60 which has a bar code label 29. If size permits, two or more objects may be stored in a single case. The object 1 remains inside the case 60 until it is removed from the system for shipping. The objects 1 inside their cases 60 are stored in a plurality of storage rack assemblies 2. Each storage rack assembly 2 includes one or more storage racks 130a, 130b, each rack having a plurality of slots 4 sized for storing the cases 60. The slots 4 in each storage rack assembly are aligned in a plurality of horizontal rows and a plurality of vertical columns. The storage rack assembly 2 may include a variety of slot sizes to accommodate a heterogeneous mix of objects.

Adjacent each storage rack assembly 2 is at least one storage transport 6. The storage transport 6 has access to each slot 4 in the storage rack assembly for both storing and retrieving objects 1. When storing an object 1, the storage transport 6 receives the object from one of a plurality of runner transports 10a–10d at one end of the storage rack assembly. The storage transport 6 receives the object 1 and moves to a selected slot 4, into which the object is stored. The storage transport 6 scans the slot label 28 and the object label 29 on the case 60. The values of the labels are provided to a CPU 18, which compares the label values to predetermined values stored in the CPU's memory 26 to ensure accuracy. If the scanned label values do not match the values stored in the memory 26, the storage operation is terminated.

When retrieving an object 1, the storage transport removes the desired object 1 from the slot 4 in which it is stored, moves to the end of the storage rack assembly 2, and transfers the object to one of the runner transports 10a–10d.

A plurality of horizontal tracks 8a–8d are located at the end of the storage rack assembly 2, each track at a different height. A runner transport 10a–10d is coupled to each track 8a–8d. During a storage operation, a runner transport 10 receives an object 1 from the conveyor storage transport 16. The runner transport then moves along its track 8 between the conveyor transport 16 and a storage rack assembly 2. When the runner transport reaches the storage rack assembly 2, the storage transport 6 removes the object from the runner transport. During a retrieval operation, a runner transport 10 receives an object 1 from the storage transport 6. The runner transport then moves along its track 8 between the storage rack assembly 2 and a conveyor transport 16 located at an end of the track. The conveyor transport 16 removes the object 1 from the runner transport 10.

Two conveyor transports 16a, 16b are located at each end of track 8a. During a storage operation, a conveyor transport 16a removes the object 1 from an opening 14 in an conveyor rack assembly 12 (which may include more than one rack, similar to a storage rack assembly). The conveyor transport moves from the location of the opening to the end of the track 8a and transfers the object 1 to one of the runner transports 10a–10d. During a retrieval operation the conveyor transport 16a removes the object 1 from the runner transport 10a and places the object in an opening 14 of the conveyor rack assembly 12.

A plurality of terminals 20a–20b are provided for human operators. During a storage operation, the operator keys in data identifying the object 1 to be stored. A database program executing in CPU 18 maintains data describing each individual object stored (e.g., type of part, date of manufacture, date received, size). The object is placed inside a case 60. The case 60 is scanned using a hand-held scanning device 62, and the case identification number is stored in a database. The operator places the object 1 in an opening of the conveyor rack assembly 12, from which it is removed by a conveyor transport 16a.

Figure 2:
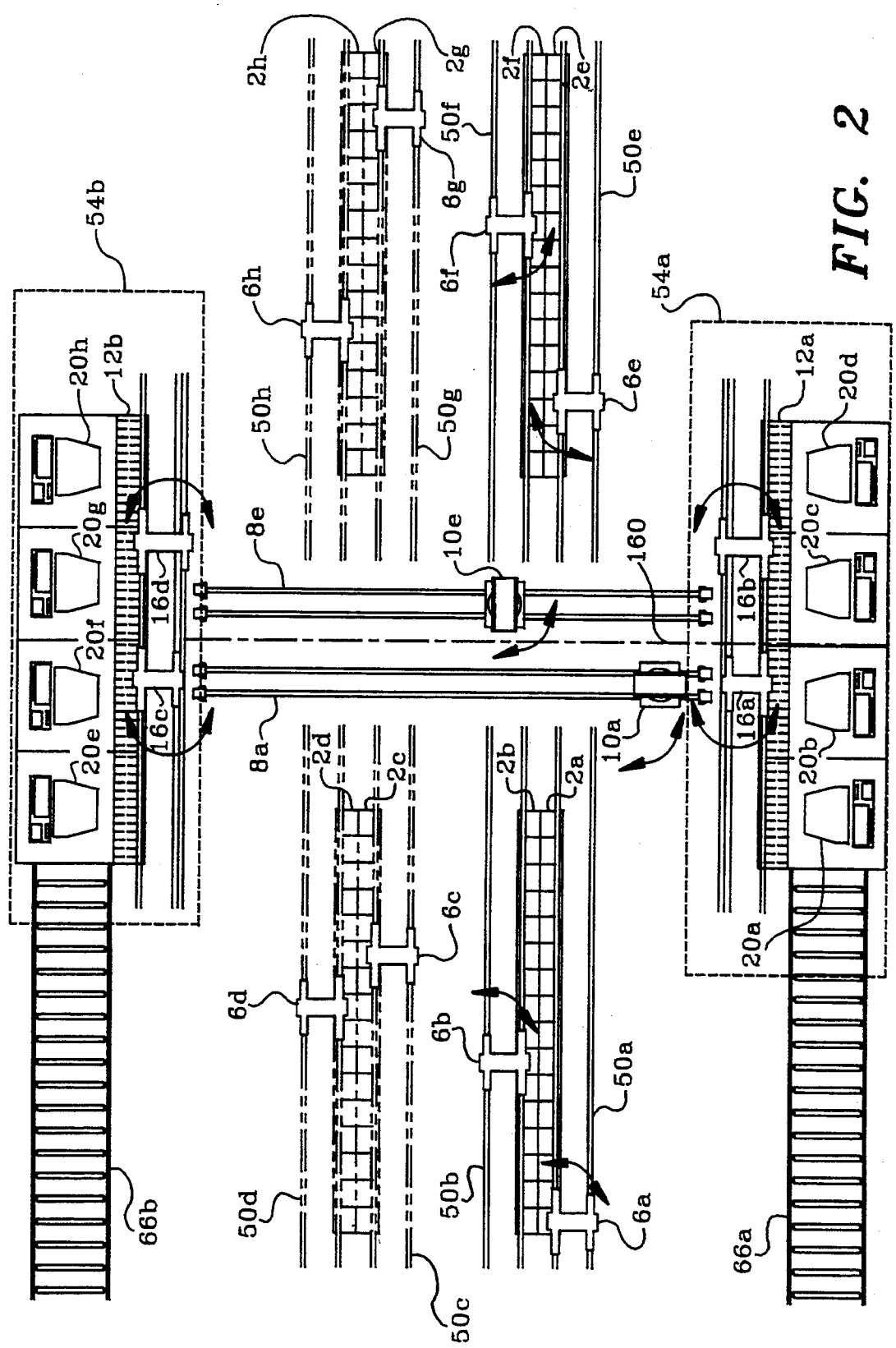
FIG. 2 is a plan view of the system shown in FIG. 1.

During a shipping operation, the operator removes the object 1 from the conveyor rack assembly 12, attaches a printed label from a printer 64 (not shown) and places the object on a conveyor belt 66, as shown in FIG. 2. The conveyor belt 66 moves the object out to a shipping area, where the object can be packaged for shipment.

During operation, multiple storage and multiple retrieval operations are performed simultaneously. Each storage operation requires, in the following order, the use of a conveyor transport 16a, a runner transport 10a and a storage transport 6. In scheduling each storage operation, storage transport 6 selection is performed using criteria which will shorten the time to complete the storage operation and distribute the objects 1 according to their categories. This is accomplished by distributing objects 1 of the same object category uniformly among all of the storage rack assemblies 2. Each time an object from a given category is stored, a storage rack assembly 2 is selected other than the last rack in which an object from the same category was stored. This facilitates subsequent retrieval of the objects. More than one object of the same category are retrieved simultaneously by allocating two or more storage transports 6 to retrieve the objects from two or more storage rack assemblies 2 at the same time.

Each retrieval operation requires, in the following order, the scheduling of one storage transport 6, one runner transport, 10a and one conveyor transport 16a. In scheduling retrieval operations, storage transport selection is based on criteria to ensure low retrieval time and turnover of inventory according to a variation of a first-in, first-out (FIFO) scheme. At the time a retrieval operation is scheduled, the storage transport is selected from a set of candidate storage transports consisting of all of the storage transports which are available. From this set of candidates, the transport 6 is selected which is adjacent the storage rack assembly 2 in which the oldest object assigned to the desired object category is stored. If two or more objects 1 in the same category must be retrieved simultaneously, two or more racks 2 having the oldest objects are selected, and one object is retrieved from each of these racks.

The operations of the storage 6 and runner 10 transports are pipelined. Each storage transport 6 receives objects 1 from one runner transport (e.g., 10a) during a storage operation, and delivers objects to another runner transport (e.g., 10b) during retrieval operations. Each runner transport 10a–10h receives objects 1 from one storage transport 6 during retrieval operations, and delivers them to another storage transport (not shown) during storage operations. While the first runner transport 10a is delivering an object to the first storage transport 6, the second storage transport 10b delivers another object to the second runner transport (not shown). Then, while the first storage transport 6 is engaged in retrieving an object 1, the first runner transport 10a which would otherwise deliver objects to the first storage transport 6 is engaged in a retrieval operation for a second storage transport. At the same time, a second runner transport 10b is available to perform the retrieval in conjunction with the first storage transport 6.

To enhance the integrity of the database of objects 1, an automated inventory operation is performed, during which the storage transport 6 adjacent each storage rack assembly 2 is actuated to sequentially move to each slot 4 within its associated storage rack assembly 2. For each slot 4, the optical scanner 30 on the storage transport 6 scans the slot label 28 and, if the slot holds an object 1, the object label 29. CPU 18 compares the slot label 28 and object label 29 are compared with the values stored in the database program. Any discrepancies are reported.

Detailed Description Structure

An exemplary automated storage and retrieval system (ASRS) in accordance with the present invention is shown in plan view in FIG. 2. A plurality of storage rack assemblies 2a–2h are aligned parallel to one another. Each storage rack assembly 2 includes one or more storage racks 130a, 130b, each rack having a plurality of slots 4 sized for storing the cases 60. If there are multiple racks 130a–130n in a storage rack assembly 2, they may be placed in horizontal rows, vertical columns, or in an array of rows and columns. Although the exact number of storage rack assemblies 2a–2h is optional, the system may be used most efficiently if the total number of storage rack assemblies 2a–2h is a multiple of four. The storage rack assemblies are positioned back-to-back in pairs (e.g., 2a and 2b). Pairs of storage rack assemblies are located on opposite sides of tracks 8a–8h (e.g., 2a and 2b opposite 2e and 2f). As shown in FIG. 1, each storage rack assembly 2a–2h has a plurality of slots 4 sized for storing objects 1 which are inside of cases 60. Objects 1 in racks 2a–2h are always stored in cases 60, and a reference to an object 1 or a case 60 hereinafter will mean the combination of an object 1 inside of a case 60, unless otherwise stated. Case 60 includes a bar code label 29. The slots 4 are positioned in a plurality of horizontal rows and a plurality of vertical columns.

Referring again to FIG. 2, adjacent each storage rack assembly 2a–2h is a respective storage transport 6a–6h. The following discussion is directed at a single exemplary storage transport 6a, but it is understood that other transports operate in the same manner. Each storage transport 6a moves along the entire length of its respective storage rack assembly 2a. During a storage operation, the storage transport 6a receives an object 1 from a runner transport 10a, moves to a desired location adjacent a desired slot 4 within the storage rack assembly 2a and places the object 1 in the slot 4. During a retrieval operation, the storage transport 6a removes a desired object 1 from its slot 4, moves to the end of the storage rack assembly 2a adjacent the track 8a, and transfers the object to the runner transport 10a.

While the exemplary embodiment only includes one storage transport 6a for each storage rack assembly, there may be more than one storage transport 6a for single storage rack assembly 2a. Adding a second or third storage transport may increase the overall system speed for storage and retrieval operations, but may also increase complexity.

If multiple transports are used, it may be desirable to provide the storage transports with the capability to cross over one another (not shown). Another alternative embodiment (not shown) would not require the two storage transports to cross over one another, but instead, a more distant transport 6a could transfer an object to the closer transport 6b, which could then transfer the object to a runner transport 10a.

As shown in FIG. 1, there may be multiple tracks 8a–8d aligned in a vertical column at the end of the storage rack assembly 2a. In the exemplary embodiment, there is one vertical column of tracks adjacent storage rack assembly 2a and another column adjacent storage rack assembly 2e. The number of tracks 8a–8d in each vertical column of tracks is equal to the number of storage rack assemblies 2a–2d that can access the column 8a–8d (in the exemplary embodiment, four). The total number of tracks 8a–8h is the same as the total number of storage rack assemblies.

A runner transport 10a–10h is coupled to each track 8a–8h, and moves between the storage transports 6a–6h and the conveyor transports 16a–16d located at both ends of tracks 8a–8h. Again, the following discussion pertains to only one runner transport, but is representative of the function of all of the transports. During a storage operation, a conveyor transport 16a places an object 1 on a runner transport 10a. The runner transport 10a moves to a position adjacent a predetermined storage transport 6a. The storage transport removes the object 1 from the runner transport. During a retrieval operation, the sequence is reversed. The runner transport 10a is actuated to a position adjacent a selected storage transport 6a. The storage transport 6a places an object 1 on the runner transport 10a. The runner transport 10a is actuated to a position adjacent the conveyor transport 16a. The conveyor transport 16a removes the object 1 from the runner transport 10a.

A shipping/receiving area 54 is located at each end of the tracks 8a–8h. Each shipping/receiving area includes a plurality of operator terminals 20, each equipped with a keyboard and a hand-held scanner 62 for reading the object labels 29 on the object cases 60, and a bar code printer 64 for printing the labels 29. Each operator terminal 20 is connected to the central CPU 18. Each shipping/receiving area 54 includes a conveyor rack assembly 12 with a plurality of openings 14 sized to accommodate the objects 1. The openings 14 penetrate the conveyor rack assemblies 12, so that an object 1 may be accessed from either side of the rack 12.

Each shipping/receiving area 54 includes a plurality of conveyor transports 16a–16b. In the exemplary embodiment, there are two transports 16a–16b at each shipping/receiving area. Each shipping receiving transport 16a receives objects from, and provides objects to, all of the runner transports 10–10d within a respective column. Since the greatest delay in the system is the time it takes for the runner transport 10a to travel between the conveyor transport 16a and the storage transport 6a, a single conveyor transport 16a can serve multiple runner transports 10a–10d without introducing further time delays. Although it is possible to increase the number of conveyor transports 16a–16b, this would increase the mechanical complexity of the system without a corresponding increase in operating efficiency.

A label is printed by printer 64 and affixed to each respective object by the operator when the operator removes the object from the opening 14 during a retrieval (shipping) operation.

During storage operations, the conveyor transport 16a removes an object 1 from an opening 14 in the conveyor rack assembly 12 and places the object on the runner transport 10a. During retrieval operations, the conveyor transport 16a removes an object 1 from the runner transport 10a and places the object in a selected opening 14 in the conveyor rack assembly 12.

The operator terminals 20a–20h all have identical hardware configurations, so that any one terminal can be allocated by the ASRS software to either storage (receiving) operations or retrieval (shipping) operations, as the workload permits. The number of terminals allocated to receiving need not match the number of terminals allocated to shipping. The number of terminals 10g–20h allocated to each (shipping and receiving) function may be modified during operation.

Figure 3A:
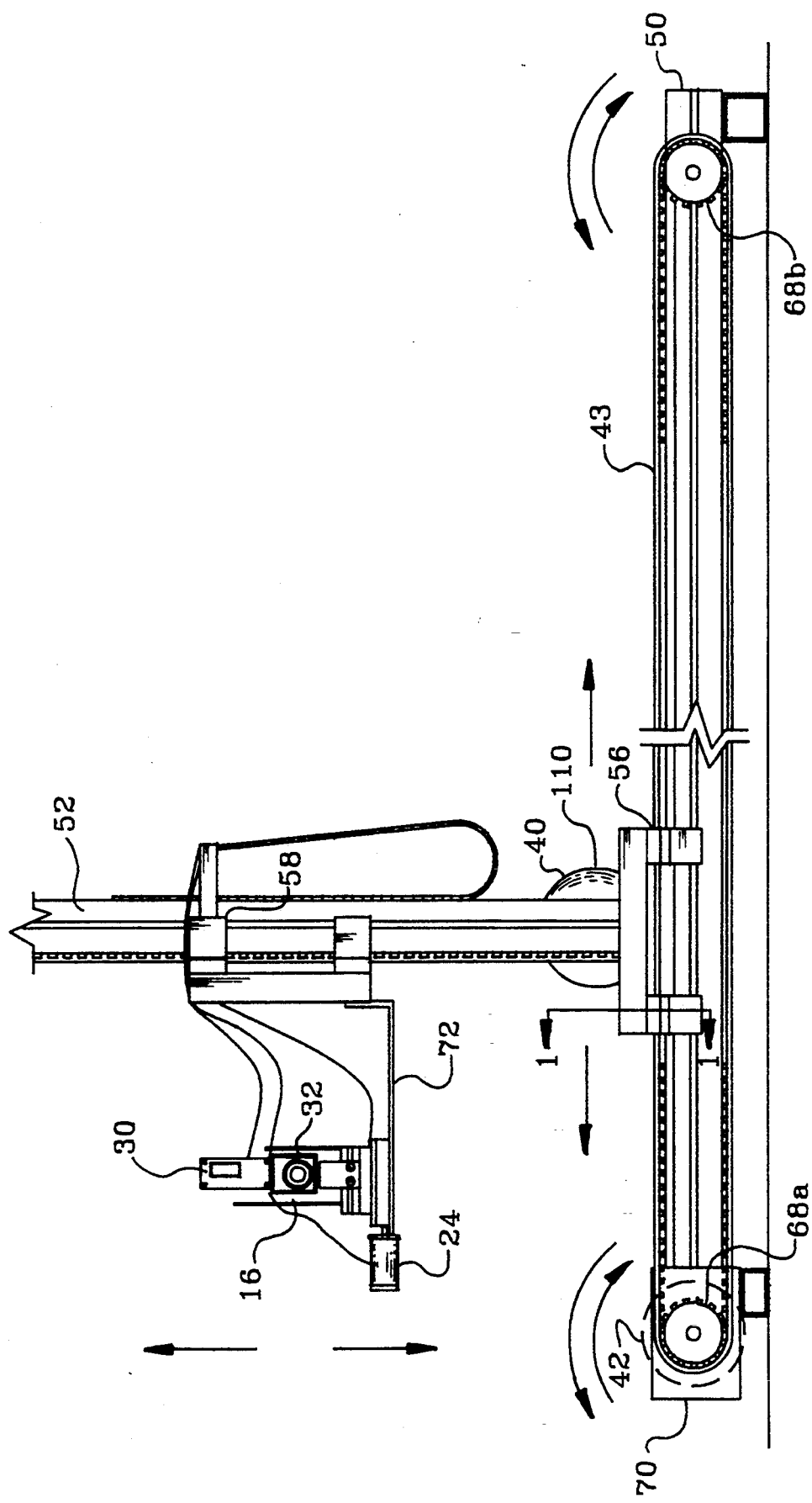
FIG. 3a is an elevation view of a storage transport.

FIGS. 3a–3d show the hardware configuration used for the storage 6a–6h and conveyor transports 16a–16h. In the exemplary embodiment, the configurations of transports 6a and 16a are identical, except for minor differences as noted below (The runner transport 10a–10h configurations are different from the storage and conveyor transports, and will be discussed separately). Referring to FIG. 3a, each transport 6a, 16a is coupled to a vertical track 52. The vertical track 52 is attached to a guide 56. The guide is mounted for rolling on a horizontal track 50a–50j. The guide is fixed to a timing belt 43 which runs along the length of horizontal track 50 and engages both gear 68a adjacent stepper motor 42 and freely rotating gear 68b, at the opposite end of horizontal track 50a–50j.

FIG. 3b is a cross sectional view of guide 56, taken along section line 1—1. The guide 56 includes a mounting plate 84 and two bearing units 86. Each bearing unit includes a suitable fastener to attach the mounting plate 84 and a bearing 80. The bearing 80 engages a round rod 88 (which may be a cold rolled stainless steel rod) mounted on track 50, so that there is very little friction opposing motion of the transport. As shown in FIG. 1, each transport 6a, 16a also has a guide 90a, 90b at the top of vertical track 52a (or 52b), coupled to a top track 92. Guides 90a, 90b maintain the alignment of vertical track 52, without adding significant friction to oppose horizontal movement of transports 6a, 16a.

Referring again to FIG. 3a, controller 70 receives control signals from CPU 18, defining desired motor rotations. Controller 70 in turn activates motor 42. When motor 42 is activated, gear 68a rotates and the timing belt revolves around the track, causing the transport 6 (or 16) to move in a straight line along the track 50.

As shown in FIG. 1, two conveyor transports 16a, 16b are coupled to a single track 50. Two separate timing belts 43a, 43b engage separate motors 42a and 42b. Each transport 16a, 16b has its guide 56 mounted to a respectively different one of the timing belts 43a, 43b. This configuration allows the conveyor transports 16a, 16b to cross the centerline (not shown) of the conveyor rack assembly 12. Both transports can move to the same side of the rack 12, but they cannot cross over one another.

Referring again to FIG. 3a, in the exemplary embodiment, the same hardware elements are used to actuate the transport 6 (or 16) in the vertical direction as in the horizontal direction, including motor 40, track 52, timing belt 41 and guide 58 and gears (not shown). Depending on the dimensions of the storage rack assemblies 2 and the conveyor rack assemblies 12, the size of motor 40, track 52, belt 41 and guide 58 may differ from respective motor 42, track 50, belt 43 and guide 56. A mounting plate 72 for the object handling assembly 74 is mounted on guide 58.

FIG. 3c shows the object handling assembly 74 of transport 6a (or 16a). The object handling assembly 74 includes storage channels 34a and 34b (forming a storage holder), which are stationary for holding an object during both storage and retrieval operations. A conventional laser scanner 30 is pointed in the direction of storage channels 34a and 34b, to read object labels 29 and slot labels 28. A portion of each case 60 consists of an iron compound which is drawn towards magnets. An electromagnet assembly 32 provides the attractive force necessary to pull an object case 60 out of its slot 4 during a retrieval operation (or opening 14 during a storage operation). The electromagnet assembly 32 may also be actuated towards a rack 2 (or 12) to push the case 60 into a slot 4 (or opening 14), as shown in phantom in FIG. 3d. The scanner 30 is mounted on the electromagnet assembly 32, so that the scanner 30 and magnet 33 move together.

Figure 3D:
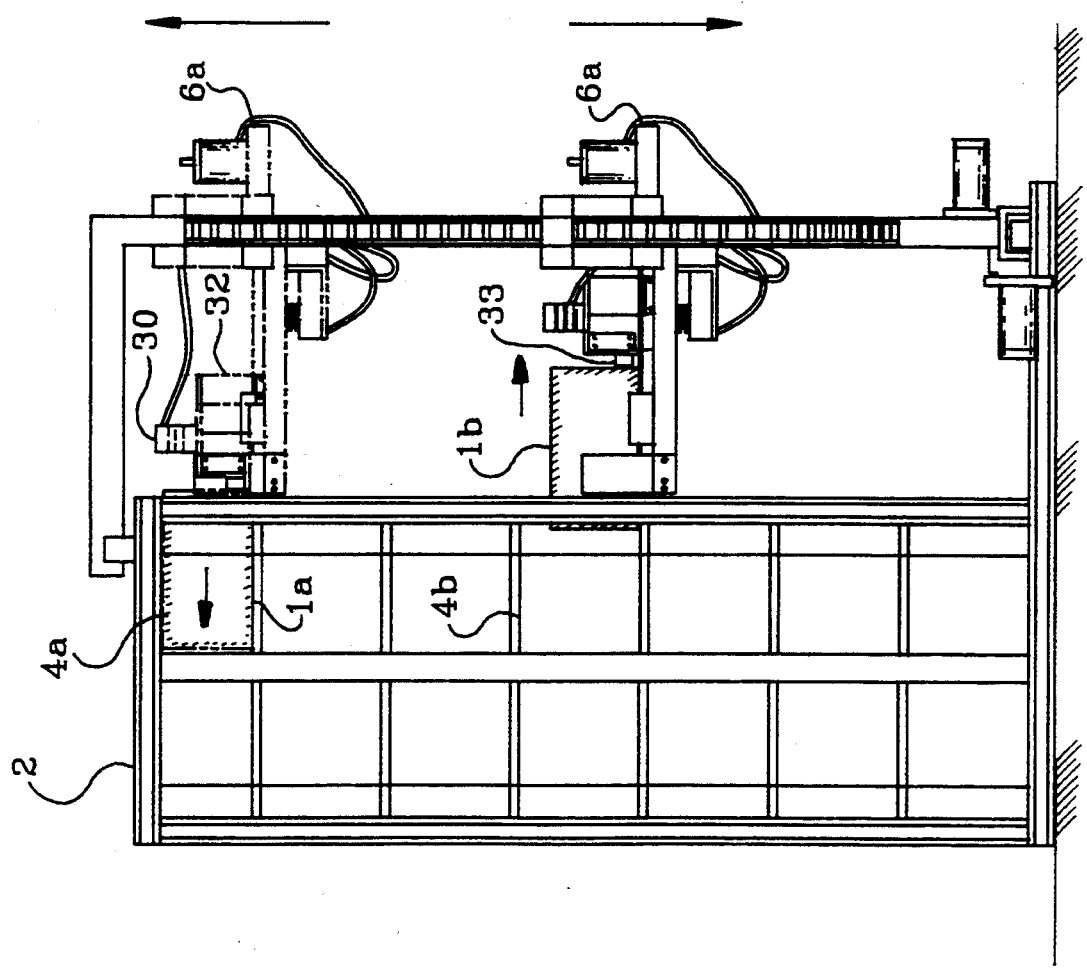
FIG. 3d shows two conveyor transports from the system shown in FIG. 1.

Assembly 74 includes a drive mechanism for actuating the electromagnet assembly 32 which is similar to the drive mechanism for horizontal motion of the entire transport 6 (or 16). As shown in FIG. 3c, a stepper motor 38 is mounted on the object handling assembly 74. Motor 38 drives a timing belt 76 in response to control signals from a controller 22. The electromagnet assembly 32 is fixed to a guide 78 similar to guide 56. Guide 78 includes bearings (not shown) for rolling along a horizontal track 82, which is similar to track 50. When the motor is activated, the timing belt 76 revolves around the track 82, moving the electromagnet assembly 32 forward or backward, as desired. FIG. 3d shows transport 6a during two different operations; a storage operation (shown in phantom) and a retrieval operation. As shown in phantom, the electromagnet assembly 32 in transport 6a is shown moving forward to push an object 1a out of the storage channels 34a, 34b and into a slot 4a.

For the subsequent retrieval operation, electromagnet 33 is moving backwards away from slot 4b. The electromagnet 33 is energized to pull the case 60 of the object 1b out as assembly 32 moves away from the slot 4b. In each transport, storage channels 34a and 34b guide the object onto the object handling assembly 74 and prevent the object from falling out during movement of the transport 6a.

The object handling assembly 74 is mounted for rotating on mounting plate 72, under control of a stepper motor 24. When a storage transport 6a retrieves an object 1 from rack 2, its object handling assembly 74 rotates 90 degrees so that the storage channels 34a and 34b are directed at the runner transport 10. Similarly, when the storage transport receives an object 1 from a runner transport 10, the assembly 74 rotates 90 degrees to direct the storage channels 34a, 34b at the storage rack assembly 2. During a retrieval operation, the object handling assembly 74 in the conveyor transports 16a rotates 180 degrees after removing an object from runner transport 10, to position the storage channels 34a, 34b (and object 1) for inserting the object into the conveyor rack assembly 12. Similarly, during a storage operation, the object handling assembly 74 in transport 16 rotates 180 degrees after removing the object from the rack 12 to position the object 1 for transfer to a runner transport 10a.

Figure 4B:
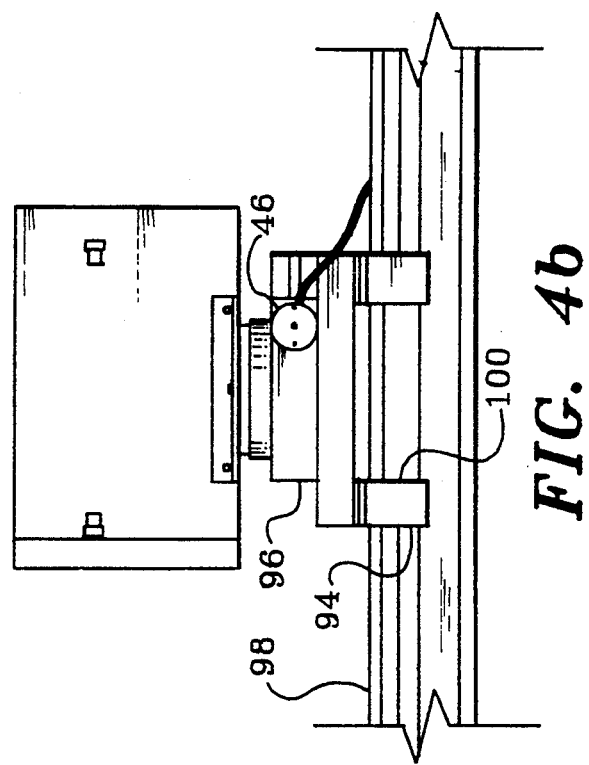
FIGS. 4a and 4b show two different views of a runner transport from the system shown in FIG. 1.
Figure 4A:
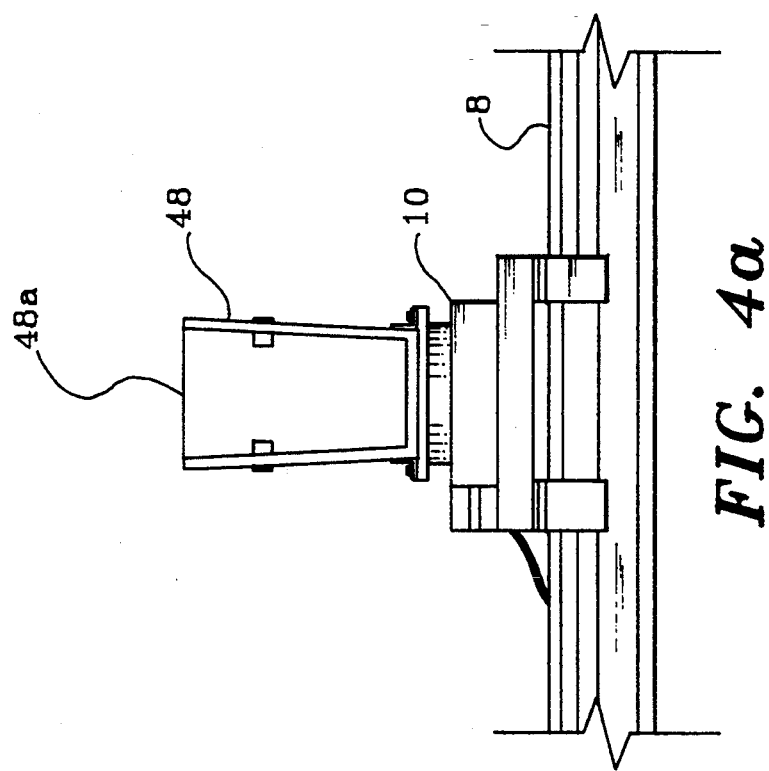

FIGS. 4a and 4b show a runner transport 10 in greater detail. The runner transport includes a runner holder consisting of a U-shaped channel 48, with a back wall 48a for holding an object 1. The U-shaped channel 48 rotates under control of a stepper motor 46. A non-rotating mounting plate 96 is coupled to a guide 100 which is similar to guide 56. Guide 100 provides a low friction mounting for the runner transport 10. Guide 100 is also fixed to a timing belt 98 which runs the length of track 8. Timing belt 98 revolves around track 8 under control of a stepper motor 44 (not shown). This configuration is similar to the configuration of the horizontal actuating components (belt 43, motor 42, guide 56, track 50) used for the storage transport 6 and conveyor transport 16. When the motor 44 is activated, the runner transport moves horizontally between the storage transports 6 and the conveyor transports 16.

Figure 4C:
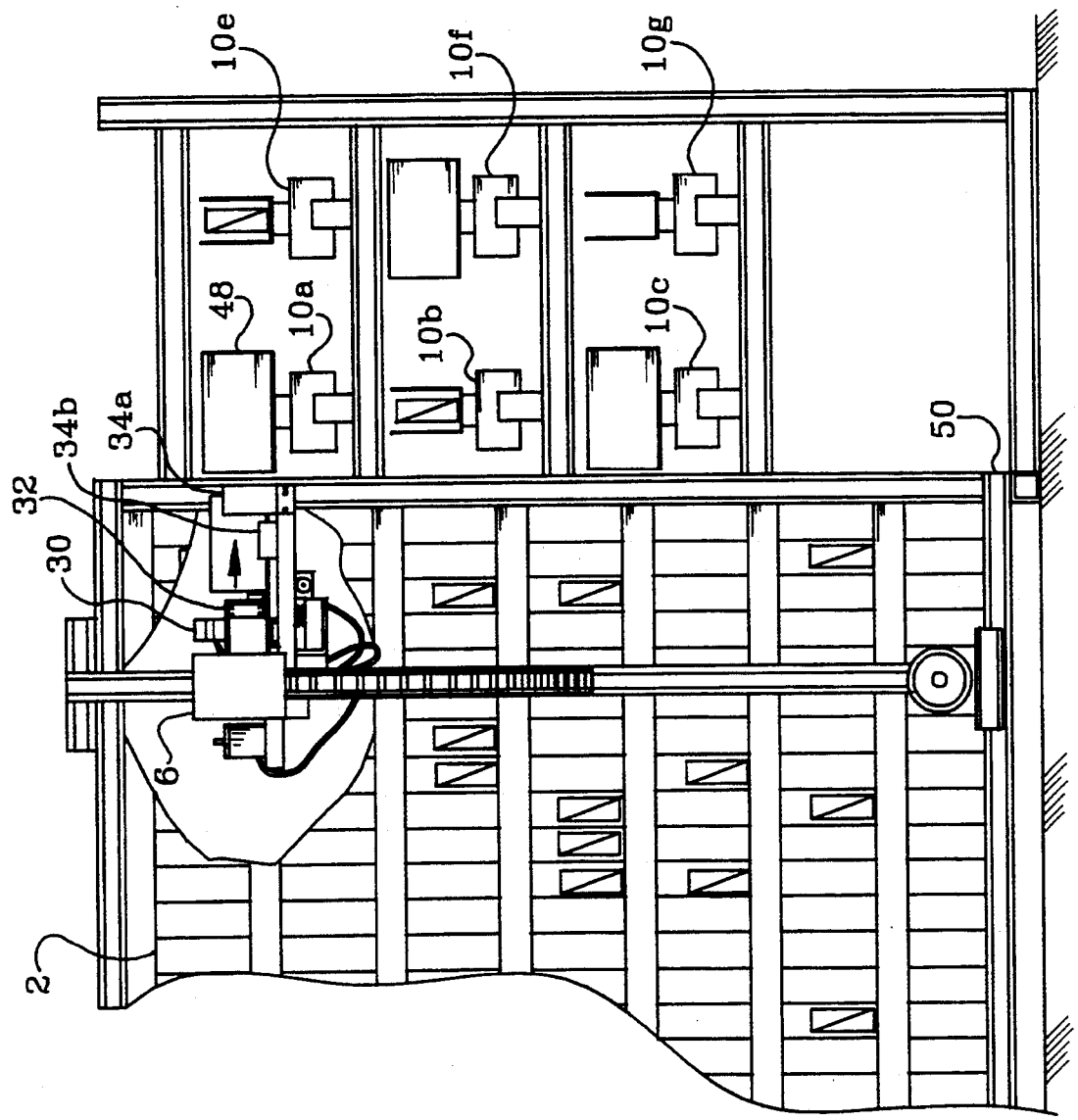
FIG. 4c shows a storage transport and a runner transport from the system shown in FIG. 1.

As shown in FIG. 4c, runner transport 10a has its channel 48 oriented parallel to track 50. Storage transport 6 has its channels 34a, 34b aligned with channel 48. In this position, an object is transferred between the storage transport 6 and the runner transport 10 by actuating the electromagnet assembly 32 to push the object onto the channel 48. Once the object 1 is on the runner transport, the runner channel 48 is rotated 90 degrees, (see transports 10b and 10e) for subsequent transfer between the runner transport 10a and the shipping receiving transport.

FIG. 4d shows the transfer of objects from conveyor transports 16a, 16b to runner transports 10a-10c. Conveyor transport 16a is receiving an object 1a from the conveyor rack assembly 12. This operation proceeds in the manner described above for retrieval operations. Motor 24a then rotates the object handling assembly 74a to face the runner transports. Conveyor transport 16b has already rotated its object handling assembly 74b under control of motor 24b (not shown). Assembly 74b is moved to the same height as runner transport 10c. Transport 16b is ready to transfer the object 1b to runner transport 10c by actuating electromagnet assembly 32b forward.

Figure 5:
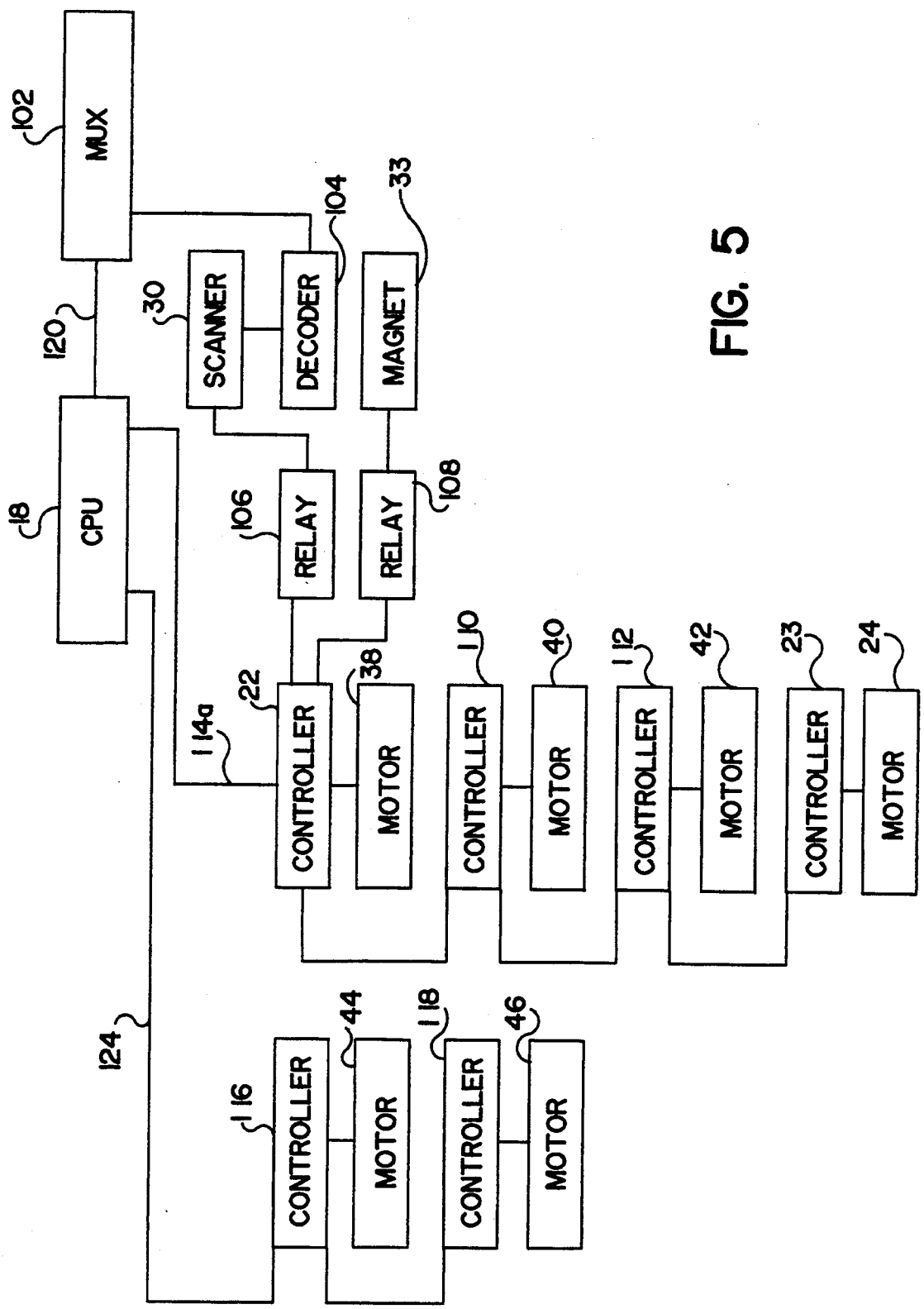
FIG. 5 is a block diagram showing the controls for the system shown in FIG. 1.

FIG. 5 shows a block diagram of the control means for operating a storage 6 or conveyor transport 16. All of the transports 6, 16 are under the control of a single master CPU 18. The CPU 18 issues control signals which include command sequences to the motor controllers 22, 23, 110, 112. The four motor controllers are connected by a serial link 114a–114d which may be RS-232. There is one serial link 114a from the CPU to each transport 6, 16. The commands specify the desired angle through which the associated motors 38, 24, 40 and 42 must rotate. The commands are issued over a single path 114a. The command sequences include a string of bits which indicate which controller is to be actuated by the command. Each controller 22, 23, 110, 112 only responds to commands including the controller's respective identification.

Each controller 22, 23, 110, 112 receives its respective command signals and issues control signals to its associated motor, causing the motor to rotate through the desired angle. Controller 22 also provides signals to relays 106 and 108 when motor 38 is activated. When relay 106 is closed, it activates scanner 30 to read a bar code label. The scanner 30 generates signals representing the labels, which are converted to digital data signals by decoder 104. A single multiplexer 102 receives the digital data signals from all of the decoders 102 in the system, multiplexes the signals together and provides digital data to the CPU 18 via a single serial port 120. When relay 108 is closed, it activates the electromagnet 33, in order to pull an object 1 out of a slot 4, an opening 14 or a runner transport channel 48.

Each of these control elements in the configuration is replicated for each storage and conveyor transport, with the exception of the CPU 18, and the multiplexer 102. There is only one CPU 18 and one multiplexer 102.

The runner transports 10 are actuated in a similar matter. There are only two motors 44, 46 and two respective controllers 116, 118 for each runner transport. Each runner transport 10 is allocated to a separate serial link 124 and is under control of CPU 18.

In addition to the hardware elements described above, the system also requires data structures which are stored in a memory 26. It is understood that these data may be stored under the control of a conventional database management system, such as Ingres, produced by the ASK/Ingres Company.

The tables discussed in the following paragraphs use terminology which may differ from the terminology used in the description of the tables herein. The glossary below explains the correspondence between terms used throughout this description and the terms which appear in the tables. It should also be noted that in the following discussion, references are made to processes (e.g., the runner transport process) which are control software programs executed in the CPU 18. These processes are distinguished from the hardware they control (e.g., runner transport 10).

| Glossary | |
| --- | --- |
| Name in Tables | Name used in the specification |
| Aisle | Storage rack assembly (2) |
| Conveyor rabbit - | Conveyor transport (16) |
| DAMS | Discrete alarm monitoring system (not shown) |
| ECI | object category (defined by an object ID, part number, or SKU) |
| Emergency Kill | stop processing and set a trap for restart |
| Grabber | magnet assembly (32) |
| Light | an indicator at a shipping or receiving station to direct the operator to a specific slot (not shown) |
| Lock | a safety mechanism to prevent an operator from accessing a slot while the conveyor transport is moving (not shown) |
| PID | Process ID |

-continued

| Glossary | |
|---|---|
| Name in Tables | Name used in the specification |
| Plug | Object (1) |
| Quarantine | Stop all motors for a given transport, change status to "quit", Send the kill command to the given motors, write an error message to a log file, alert the supervisor, and kill the given process |
| Rabbit | Storage transport (6) |
| Receiving | storage |
| Runner | Runner transport (10) |
| Shipping | retrieval |

Tables 1a–1d show the types of data stored in the inventory database. Table 1a lists the information needed to describe each object 1 in the inventory. Table 1b lists the attributes which are common to each object 1 within an object category. Table 1c describes allowable substitutions which may be made in the event that no objects within the category requested are available in inventory, but objects within the allowable substitution category are available. Table 1d lists information which is stored for each slot, identifying the last object which was stored in that slot. This information may be needed to reconcile discrepancies which are detected during an inventory.

TABLE 1A

Plug Inventory

| Table elements - | 1) Slot Number | int2 | (1 to # Slots) |
|---|---|---|---|
| | 2) Aisle Number | int2 | (1 to # Aisles) |
| | 3) Size | char1 | (5 or 9) |
| | 4) ECI | char6 | (Bellcore Catalog) |
| | 5) Manufactured Date | date | (LT Present Date) |
| | 6) Received Date | date | (LE Present Date) |

TABLE 1B

Plug Reference

| Table elements - | 1) ECI | char6 | (Bellcore Calatog) |
|---|---|---|---|
| | 2) Size | char1 | (5 or 9) |
| | 3) Volume Category | char1 | (L, M, or H) |
| | 4) Purchase Price | float4 | (GT 0) |

TABLE 1C

Plug Substitution

| Table elements - | 1) ECI | char6 | (Bellcore Catalog) |
|---|---|---|---|
| | 2) Substitute ECI | char6 | (Bellcore Catalog) |
| | 3) Version Number | int2 | (GE 1) |

TABLE 1D

Plug Transaction

| Table elements - | 1) Slot Number | int2 | (1 to # Slots) |
|---|---|---|---|
| | 2) Aisle Number | int2 | (1 to # Aisles) |
| | 3) Last ECI In | chars | (Bellcore Catalog) |
| | 4) Date In | date | (LT Present) |

Table 2a lists the status data which are maintained for each runner transport 10a–10h. Table 2b lists the status data which are maintained for each storage transport 6a–6h and conveyor transport 16a–16h. Table 2c lists the attributes which are identified for each slot 4 in the storage rack assemblies 2. Table 2d lists attributes which are identified for dedicated receiving stations. This data may not be necessary if dedicated receiving stations are not used. In the exemplary embodiment, any operator terminal 20 may be used for either or both of shipping (retrieval) and receiving (storage) operations; the data in Table 2d are not used. Table 2e lists the opening 14 attributes which are used by the conveyor transport 16 to place an object 1 in the conveyor rack assemblies 12.

TABLE 2A

Runner Status

| Table elements - | 1) Type | char1 | (R or S) |
|---|---|---|---|
| | 2) Number | int2 | (1 to 17 + #aisles) |
| | 3) Load Height | int4 | (0 to 504000) |
| | 4) Status | char1 | (S, I, R, or Q) |
| | 5) PID | int2 | (1 to 32768) |

TABLE 2B

Rabbit Status

| Table elements - | 1) Aisle Number | int2 | (1 to 17 + #aisles) |
|---|---|---|---|
| | 2) Receiving Distance | int4 | (0 to Max. Length) |
| | 3) Shipping Distance | int4 | (0 to Max. Length) |
| | 4) Status | char1 | (S, I, R, or Q) |
| | 5) PID | int2 | (1 to 32768) |

TABLE 2C

Slot Position

| Table elements - | | | |
|---|---|---|---|
| | 1) Slot Number | int2 | (1 to 17 + #aisles) |
| | 2) Horizontal Distance | int4 | (0 to Max. Length) |
| | 3) Vertical Distance | int4 | (0 to Max. Length) |
| | 4) Volume Category | char1 | (L, M, or H) |
| | 5) Size | char1 | (5 or 9) |

TABLE 2D

Station Position

| Table elements - | | | |
|---|---|---|---|
| | 1) Station Number | int2 | (1 to 17 + #aisles) |
| | 2) Size | char1 | (5 or 9) |
| | 3) Distance | int4 | (0 to Max. Length) |

TABLE 2E

Shipping Inventory

| Table elements - | | | |
|---|---|---|---|
| | 1) Station Number | int2 | (1 to 17 + #aisles) |
| | 2) Slot Number | int2 | (1 to # Slots) |
| | 3) Horizontal Distance | int4 | (0 to Max. Length) |
| | 4) Vertical Distance | int4 | (0 to Max. Length) |
| | 5) Size | char1 | (5 or 9) |
| | 6) ECI | char6 | (Bellcore Catalog) |
| | 7) Shipping Notice | int4 | (1 to 2,147,483,648) |

Table 3a lists the data which are included in storage operation request messages sent to the storage operation queues 140, 144, and 148 for the storage transport 6, the runner transport 10 and the conveyor transport 16 respectively. Table 3b lists the data which are included in retrieval operation request messages sent to the retrieval operation queues 142, 146, and 150 for the storage transport 6, the runner transport 10 and the conveyor transport 16 respectively. Table 3c lists the status data which are needed by the CPU 18 before a storage or retrieval operation can begin. The status is formed by "ANDing" the status of each asset (transports 6, 10, 16) and, for a storage (receiving) operation, a notification by the operator that the object is placed in the opening 14 for the conveyor transport 16.

TABLE 3A

Message Queues

Queue name - Receiving Queue
Queue structure - long type; (Runner, Rabbit, or Station Number)
```
    struct rec_msg {
        int station;
        char size;
        int runner;
        int aisle;
        int slot;
    }
```

TABLE 3B

Queue name - Shipping Queue
Queue structure - long type; (Runner, Rabbit, or Station Number)
```
    struct ship_msg {
        int aisle;
        int slot;
        int runner;
        int station;
        char size;
        int shnotice;
        char last_flg;
    }
```

Operation

Figure 6A:
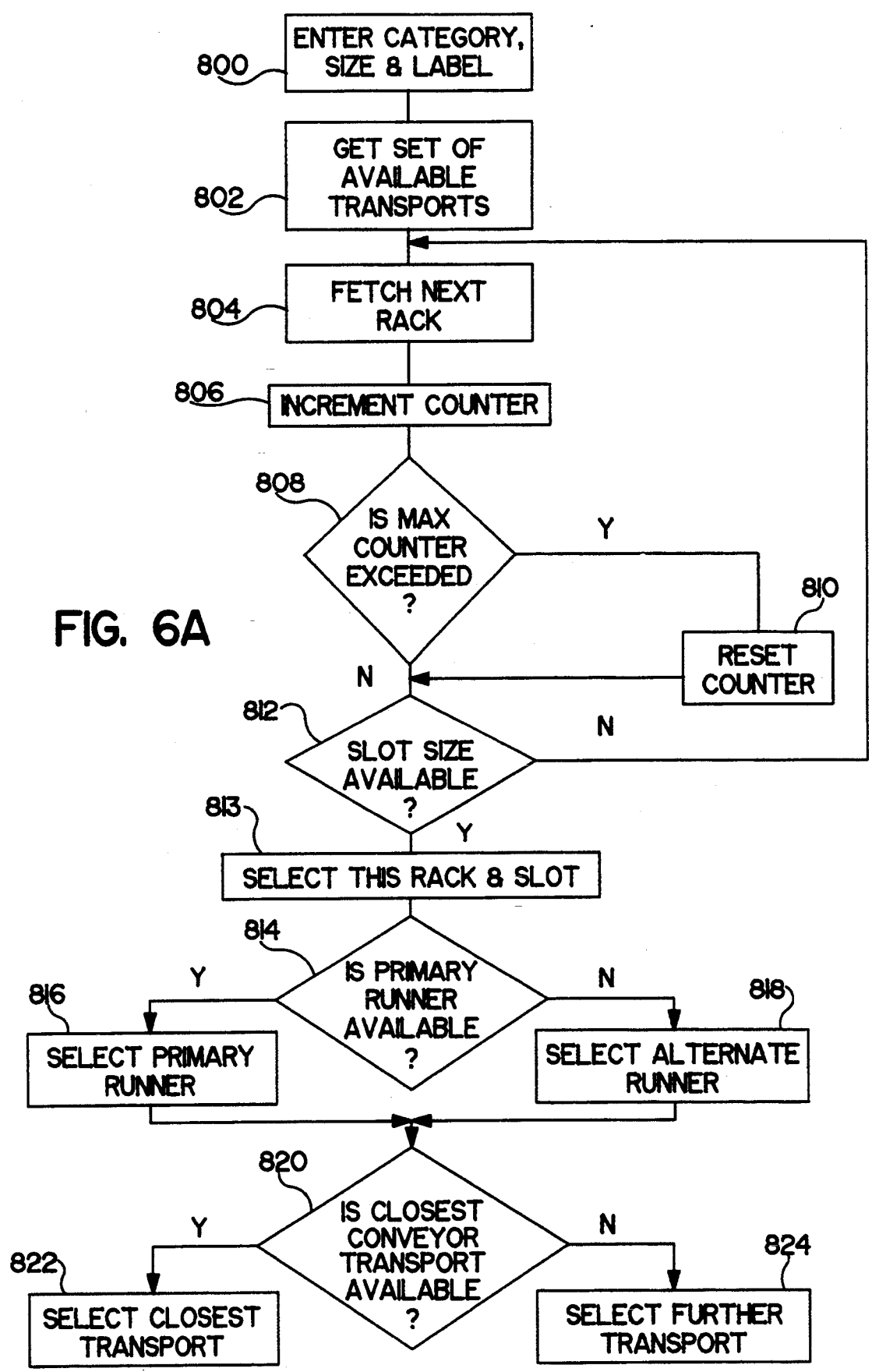
FIGS. 6a, 6b and 6c are flow charts of the transport selecting process.

FIG. 6a is a flow chart showing the sequence of steps which are performed by storage rack assembly selection means (implemented in software in the exemplary embodiment) during a storage operation, to select which of the available transports are used. Storage transports are selected in accordance with a predetermined transport selection function. Storage slots are selected in accordance with a predetermined slot selection function. At step 800, an operator enters the object category and size into a terminal 20a, places the object 1 in its case 60, scans in the label of the case 60, using a hand held optical scanner 62, and places the object in an opening 14 of the rack 12. The exemplary embodiment allows storage of more than one object 1a-1n in a single case 60, if the size of the object permits it. By this method, data for each object 1a-1n are entered individually, so that object attribute data (manufacture date, date received, storage location) are still maintained with individual object granularity.

Step 802 begins when the last previous storage or retrieval operation begins execution. At step 802, the CPU 18 checks the status of each storage transport 6a-6h. CPU 18 creates an ordered list which includes all available storage transports 6a-6h. This list excludes any transport which is down for maintenance or repair.

At step 804, the CPU 18 fetches from memory 26 a sequence value which identifies the next storage rack assembly 2 to receive an object 1 having the same object category as the object 1 currently being stored. The CPU maintains a counter for storage rack assembly sequence values for each object category. At step 806, the counter is incremented to the sequence value for the next storage rack assembly 2. At step 808, if the counter value exceeds the number of storage rack assemblies 2, then the counter is reset to the value of the first storage rack assembly at step 810. At step 812, storage slot selection means (included within the software in the exemplary embodiment) check the database in memory to determine if the selected storage rack assembly 2 has any slots 4 available which are large enough to store the current object 1. The slot data entries 154 are examined sequentially (i.e., according to the sequence in the ordered list in which the slot data are stored in table 2c), until an empty slot 4 on the selected rack 2 with the desired slot size is found. If a slot 4 is found, step 813 is executed to select the storage rack assembly 2, its associated storage transport 6a and the appropriate slot. Selection is performed by placing a storage operation request message (containing commands) in the storage operation queue 140 for storage transport 6a adjacent this storage rack assembly. If no suitable slot is found, step 804 is executed again to select the next available storage rack assembly and transport. This process is performed for each object to determine the storage rack assembly 2 and associated storage transport 6a which will be used. These steps result in distribution of objects within each category across multiple racks (serviced by multiple storage transports) in accordance with a transport selection function. Within each rack, objects of the same category are distributed in accordance with a predetermined slot selection function.

It is understood by those skilled in the art that the slot selection criteria may be varied slightly from the exemplary embodiment to satisfy specific inventory management policies. For example, in an alternate embodiment, the slot may be selected so that the distance from the end of the rack to the slot is smallest for the most frequently accessed object categories and largest for the least frequently accessed categories. Thus, more frequently accessed objects could be assured a faster retrieval time.

Another alternate embodiment includes selecting the slot which is closest to the specific runner transport 10a from which the object will be transferred no the storage transport. Thus the vertical height of the slot 4 would be considered, as well as horizontal displacement.

At step 814, a check is made to determine if the primary runner transport 10a adjacent the selected storage transport 6a is active. There are at least two runner transports 10a-10h which can access each selected storage transport 6a-6h. One of these runner transports 10a is designated as the primary runner for transferring objects 1 to the selected storage transport. A second runner transport 10b is designated as the alternate runner for transferring objects to the selected storage transport 6a (These designations are made at system set-up time, and they remain static throughout operations). At step 814, a check is made to determine whether the primary runner transport 10a is still available (i.e., not taken down for maintenance or repairs). If the primary runner transport 10a is available, the primary runner is selected for the current storage operation. The selection process consists of placing a message (containing commands) in the storage operation queue 144 for the runner transport 10a. If the primary runner 10a is not available, then the alternate runner transport 10b is selected by placing a message in the storage operation queue 144 for alternate runner transport 10b.

At step 820, the availability of the closest conveyor transport 16a (at the shipping/receiving area 54a where the operator and object are located) is verified. So long as the closest conveyor transport 16a is available (i.e., not taken down for maintenance or repairs), the closest conveyor transport is selected at step 822 by placing a message (containing commands) in its storage operation queue 148. If the closest conveyor transport 16a is not available, then at step 824, the single remaining conveyor transport 16b at the same end of track 8a as the unavailable conveyor transport is selected by placing a message in the appropriate conveyor transport storage operation queue 148.

Figure 6B:
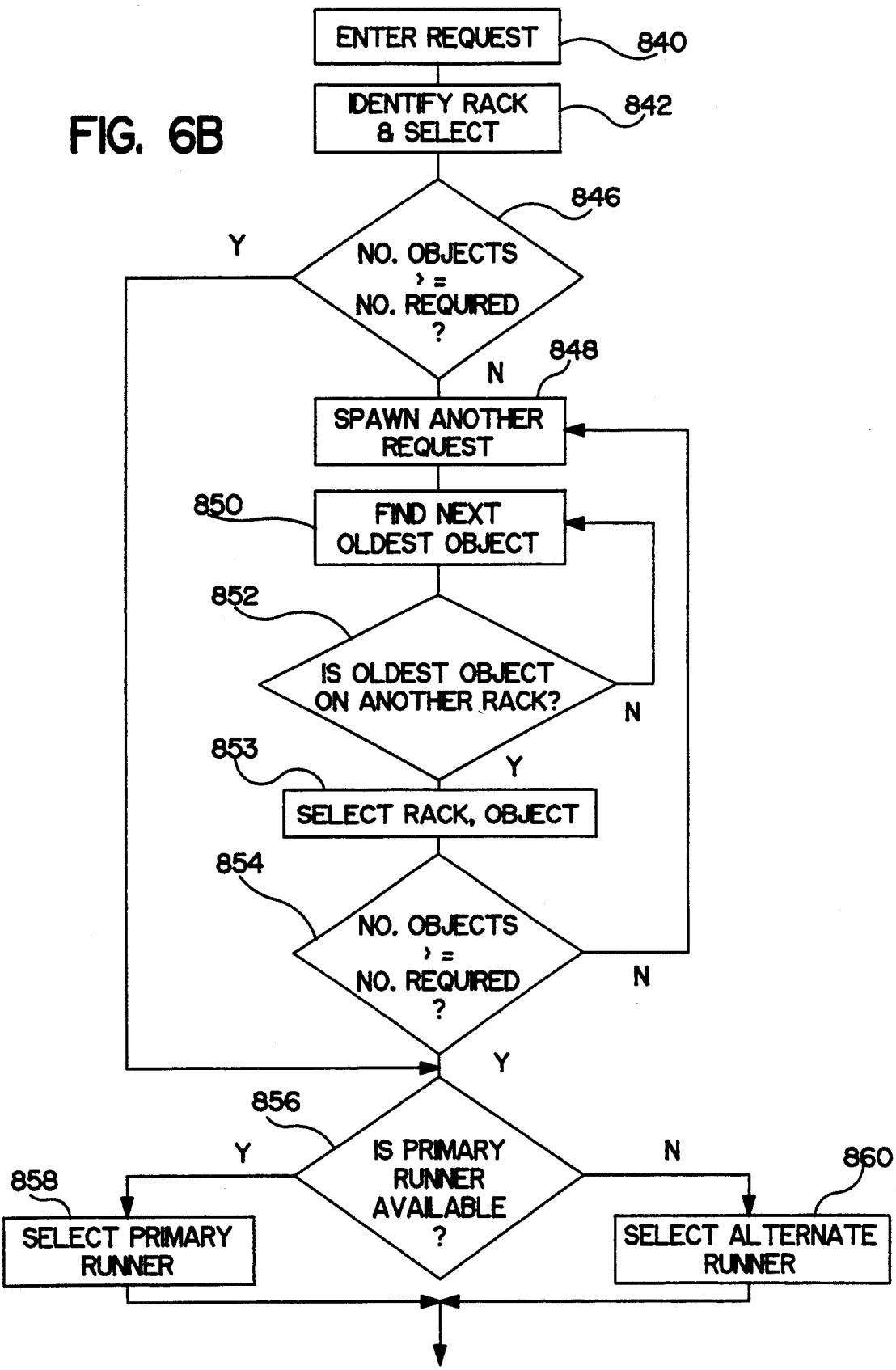

FIG. 6b shows the sequence of steps performed during the transport selection process for a retrieval (shipping) operation. At step 840, a shipping operator enters data into terminal 20b identifying the number and category of the object required and the order number.

At step 842, the CPU 18 identifies the next storage rack assembly 2 which is selected for shipping an object 1 having the same object category as the object 1 currently being retrieved (along its respective storage transport), in accordance with a predetermined transport selection function. The criterion for determination is age (the operator may select whether age is based on date of manufacture, or the date received into the ASRS). The storage rack assembly 2a is selected in which the oldest object having the desired category is stored. Selection is accomplished by placing a retrieval operation request message in the retrieval operation queue 142 of the storage transport 6 adjacent the selected storage rack assembly 2a. The rack and slot having the oldest object 1 in the desired category is selected.

At step 846, the number of objects in the case in the selected slot is compared with the number of objects required to fill the shipping order. If the case in the selected slot does not contain enough objects, then at step 848, an additional retrieval operation is spawned, to request the retrieval of more objects from the same category. The number of objects needed to satisfy the spawned request is equal to the number required by the order less the number of objects in the slot selected in step 842.

At step 850, the CPU 18 identifies the next storage rack assembly 2b which is selected to satisfy the spawned request. The first criterion for selection is again age. At step 852, the CPU 18 determines whether the rack 2b in which the oldest object from the desired category is stored is the same as the rack 2a selected in step 842. If the same rack is identified as is selected in step 842, then step 850 is repeated until a different rack is identified. Once the oldest object stored in a different rack 2b is identified, this rack 2b, its associated storage transport 6 and the identified object are selected by placing a message in the retrieval operation queue 142 of the storage transport 6, at step 853. By placing the spawned retrieval operation request message in the queue of a different storage transport than is selected in step 42, it is possible to schedule multiple storage transports to simultaneously retrieve objects to satisfy a single order. This enhances the speed of filling the shipping order.

At step 854, if the total number of objects stored in the case 60 selected in steps 842 and 852 still do not satisfy the desired number to fill the order, step 848 is repeated to spawn further retrieval requests until the desired number of objects are retrieved.

Thus the slot and rack (along with the associated storage transport) are selected in accordance with the further transport selection function and further slot selection function described above, resulting in inventory turnover and rapid object retrieval.

It is understood by those skilled in the art that for a workload in which retrievals are infrequent, and emphasis is placed on turning over older inventory, the repetition of steps 850 and 852 can be omitted so that the oldest objects in inventory are always retrieved. This may result in a slight delay in completing the retrieval if completion of the order requires a single storage transport 6 to perform two or more retrievals for the single order.

At step 856, a check is made to determine if the primary runner transport 10a adjacent the selected storage transport 6a is active. There are at least two runner transports 10a–10h which can access each selected storage transport 6a–6h. One of these runner transports 10a is designated as the primary runner for receiving objects 1 from the selected storage transport. A second runner transport 10b is designated as the alternate runner for receiving objects from the selected storage transport 6a (These designations are made at system set-up time, and they remain static throughout operations). In the exemplary embodiment, the primary runner transport 10a for receiving from a storage transport 6a is also the alternate runner for transferring to the same transport 6a. In similar fashion, the alternate runner transport 10b for receiving from a storage transport 6a is also the primary runner for transferring to the same transport 6a.

At step 858, if the primary runner transport 10a is available, the primary runner is selected for the current storage operation. The selection process consists of placing a retrieval operation request message (containing commands) in the retrieval operation queue 146 for the selected runner 10a. If the primary runner 10a is not available, then at step 860, the alternate runner transport 10b is selected by placing a message in the storage operation queue 146 for alternate runner transport 10b.

Figure 6C:
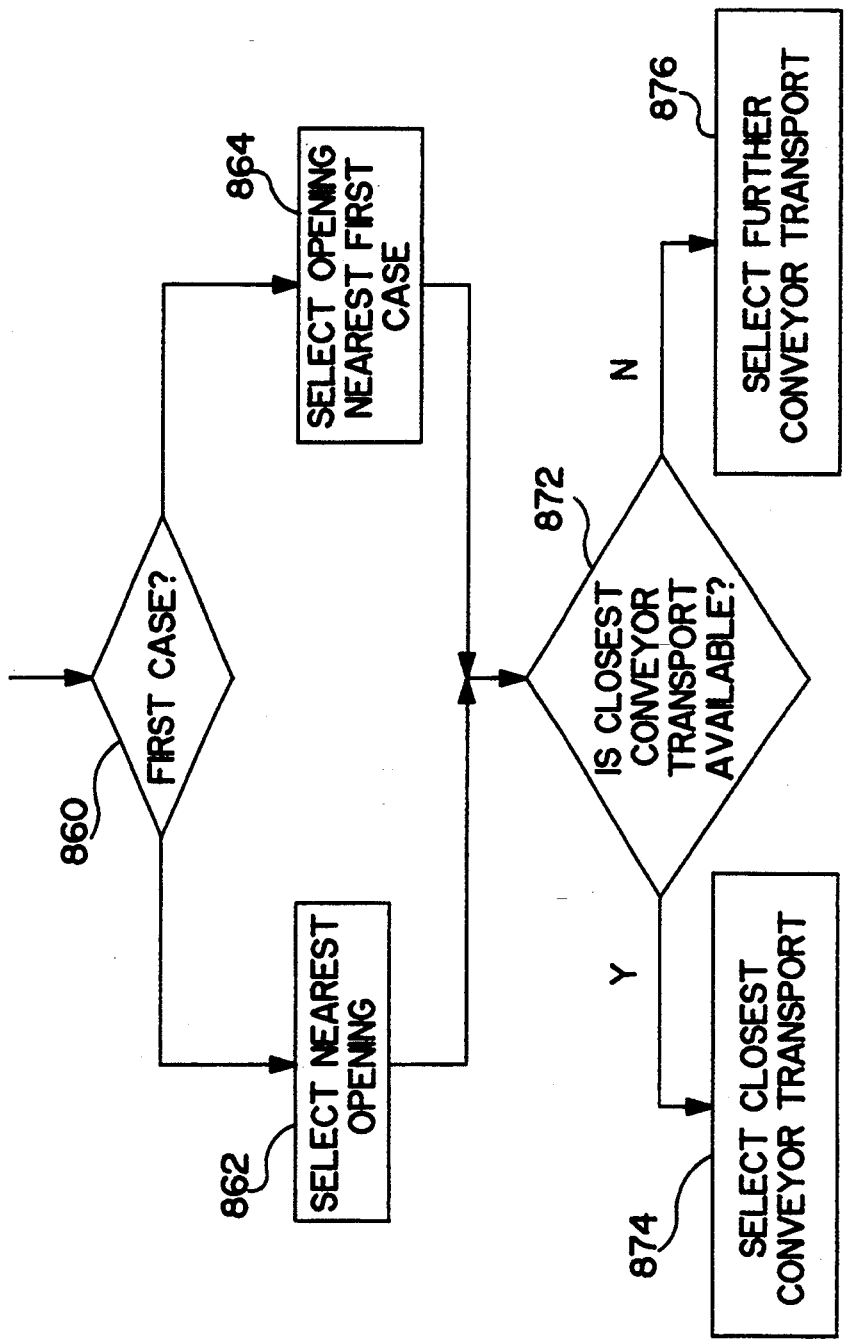

FIG. 6c is a flowchart which shows the steps which are performed in the retrieval process once a runner transport 10a is selected. At step 860, the CPU determines whether the case 60 to be placed in rack 14 is the first case 60 for the order being filled. If this is the first case 60, then at step 862, the opening 14 is selected nearest to the terminal 20 from which the retrieval request was issued. If this is not the first case 60, then at step 864 the opening 14 nearest the first case 60 is selected.

At step 872, the CPU 18 determines the availability of the conveyor transport closest to the terminal from which the retrieval was ordered. So long as the closest conveyor transport 16a is available (i.e., not taken down for maintenance or repairs), the closest conveyor transport is selected at step 874 by placing a retrieval operation request message (containing commands) in its retrieval operation queue 150. The identification of the opening 14 selection is included in the message placed in the conveyor transport retrieval operation queue. If the closest conveyor transport 16a is not available, then at step 876, the single remaining conveyor transport 16b at the same end of track 8a as the unavailable conveyor transport is selected by placing a message in the appropriate conveyor transport retrieval operation queue 150, including the opening 14 selection.

It is understood by one skilled in the art that for an system as described above, both conveyor transports may be selected to place objects on the same side of the axis of symmetry 160 (as shown in FIG. 2) between the two columns of tracks 8a–8h. The only restrictions imposed by the hardware configuration are that (1) the two transports cannot cross paths, and (2) they cannot both receive objects from runner transports 10a–10h in a single column of tracks 8a–8d at the exact same instant; i.e., they cannot be in the same place at the same time. This capability may speed up the processing of a single shipping order for multiple objects 1a–1n which are retrieved simultaneously by multiple storage 6a–6h and runner transports 10a–10h from multiple storage rack assemblies 2a–2h. The two conveyor transports can both access the same portion of the conveyor rack assembly 12 to place the objects from a single order in contiguous openings 14.

Figure 7:
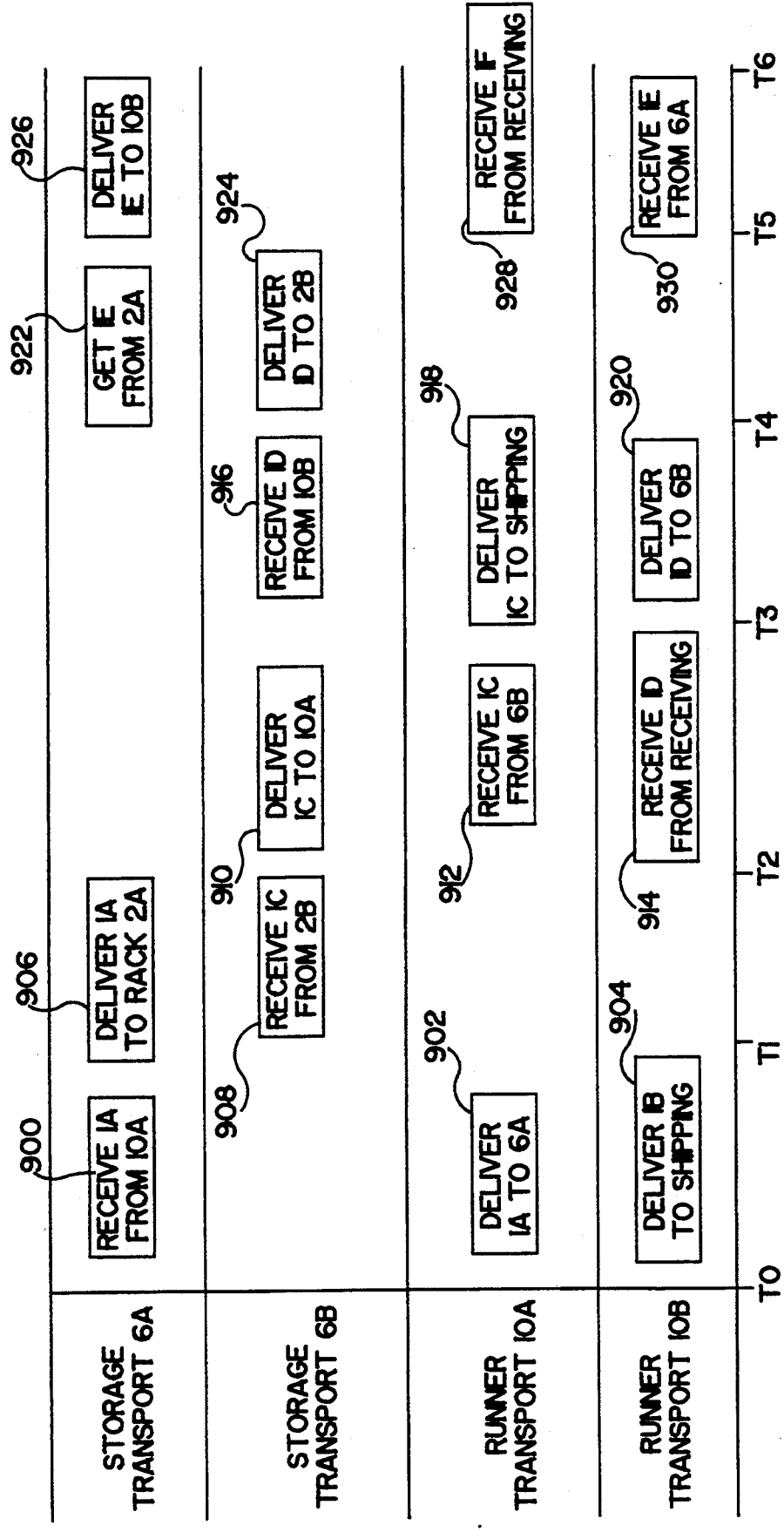
FIG. 7 is a timing diagram showing the timing relationships between storage and retrieval operations for the system shown in FIG. 1.

FIG. 7 shows typical timing relationships between the activities of the storage 6a–6h and runner 10a–10h transports. The storage transports and runner transports are assigned to a plurality of groups. In the example shown in FIG. 7, each group includes first 6a and second 6b storage transports and first 10a and second 10b runner transports. A group may include more than two storage transports 6a–6h, as will be described below, but the minimum number of two storage transports simplifies the following discussion.

The figure shows one complete cycle in which each storage transport 6a, 6b stores a respective object 1a, 1d and retrieves a respective object 1e, 1c from respective storage rack assemblies 2a, 2b. Additional objects 1b, and 1f are handled by the runner transports 10a, 10b during this period, but not by the storage transports 6a, 6b.

The times $t_0$–$t_7$ indicated in FIG. 7 are the latest time that a prerequisite event (e.g., step 900) can be completed in order for a respective subsequent event (e.g.,906) to begin. It is understood that a step may complete earlier than shown in the figure without impacting subsequent activities.

At time $t_0$, neither storage transport 6a, 6b has an object 1a–1f in its object handling assembly 74a, 74b. Runner transport 10a has an object 1a, which has been retrieved. Transport 10a is moving towards the storage transport 6a from the shipping/receiving area 54a (In the exemplary embodiment, the shipping area and the receiving area are both distributed within each area 54a and 54b). Runner transport 10b has object 1b and is moving towards the shipping/receiving area 54a. The following activities occur between $t_0$ and $t_1$. At steps 900 and 902, storage transport 6a receives object 1a from runner transport 10a. At step 904, runner transport 10b delivers object 1b to conveyor transport 16a (not shown), to transfer to shipping.

Before $t_2$, at step 906, storage transport 6a places object 1a (which it received from transport 10a) in storage rack assembly 2a. Meanwhile, storage transport 6b retrieves object 1c from storage rack assembly 2b.

Before $t_3$, at steps 910 and 912, storage transport 6b transfers object 1c over to runner transport 10a, for delivery to shipping. At step 914, runner transport 10b receives object 1d from receiving, by way of conveyor transport 16a.

Before $t_4$, at steps 916 and 920, storage transport 6b receives object 1d from runner transport 10b. Meanwhile, at step 918, runner transport 10a completes delivery of object 1c to shipping by way of conveyor transport 16a.

Before $t_5$, at step 922, storage transport 6a retrieves object 1e from storage rack assembly 2a. At step 924, storage transport 924 delivers object 1d to storage rack assembly 2b.

Before $t_6$, at steps 926 and 930, storage transport 6a transfers object 1e to runner transport 10b. Runner transport 10a receives another object 1f from receiving by way of conveyor transport 16a.

At time $t_6$, the group 6a, 6b, 10a, 10b has returned to the same configuration as at $t_0$. Neither storage transport 6a, 6b has an object 1a–1f in its object handling assembly 74a, 74b. Runner transport 10a has an object 1f, which has been retrieved. Transport 10a is moving towards the storage transport 6a from the shipping-/receiving area 54a. Runner transport 10b has object 1e and is moving towards the shipping/receiving area 54a. Steps 900-930 are repeated.

By the pipelined approach shown in FIG. 7, a system in accordance with the invention avoids delays which could occur if each storage transport 6a-6h delivered objects to, and received objects from a respective single runner transport. Furthermore, since each transport (storage and runner) alternates between storage operations and retrieval operations, no time is wasted returning to a home position after each operation.

Thus, each time the storage transport 6a moves away from a respective runner transport 10a or 10b, it performs a storage and a retrieval from storage rack assembly 2a before returning to meet the runner transport 10b or 10a. Each time a runner transport 10a arrives from the shipping/receiving area 54a, it performs a storage and a retrieval before returning to area 54a. Each time the runner transport 10a arrives at area 54a, it performs a retrieval (shipping) operation and a storage (receiving) operation before returning to the storage transports 6a, 6b.

Although two contiguous storage transports 6a, 6b and two contiguous runner transports 10a, 10b were used in the example just described, non-contiguous transports may also be used to make up a group. For example, a group may consist of storage transports 6a and 6c and runner transports 10a and 10d.

As noted above, a group may include more than two storage transports. For example, a group may include storage transports 6a-6d and runner transports 10a, 10b. In this variation, runner transport 10a delivers objects to storage transports 6a and 6c and receives objects from storage transports 6b and 6d. Runner transport 10b delivers objects to storage transports 6b and 6d, and receives objects from storage transports 6a and 6c. A full cycle of storage and retrieval operations with four storage transports in the group might include a full set of operations as shown in FIG. 7, followed by another full set of operations in which storage transports 6c and 6d would store and retrieve objects instead of respective storage transports 6a and 6b.

It is understood that many variations using different numbers of storage transports 6a-6h and runner transports 10a-10h are possible, with the constraint that each storage transport receives objects from a different runner transport than the runner to which that storage transport delivers objects. Likewise, each runner transport receives objects from a different group of storage transports than the group of storage transports to which that runner transport delivers.

Tables 4a and 4b list pseudo-code describing the processes which control the runner transport 10 during receiving (storage) and shipping (retrieval), respectively. Steps 201 through 209 in table 4a and steps 300 through 309 in table 4b initialize the queues and shared memory tables when each transport is brought on line. Steps 210 through 247 describe the control activities for a single runner transport 10 during receiving operations. These steps are executed continuously until the runner transport is commanded offline at steps 248-251 or an error condition is detected at step 252.

At step 210, the runner transport process checks whether there are any storage operations to perform in its storage operation queue 144. At step 211, the runner transport is moved to its respective station adjacent the conveyor transport 16. At steps 212 through 217, the status of the positioning step is identified. At step 218, a status message is received from the conveyor transport process when the conveyor transport 16a has placed an object 1 in the runner transport channel 48. Steps 220 through 240 describe the transfer of the object over to the storage transport 6a. At step 222, the runner transport moves to its position adjacent the rack 2 into which the object 1 will be stored, and rotates 90 degrees to align its channel 48 with the storage transport channels 34a, 34b. At steps 223 to 228, the status of these steps is reported to the process which controls the storage transport 6a. At step 229, the runner transport awaits the status message from the storage transport process that transport 6a has removed the object 1 from channel 48 of the runner transport 10a. At steps 236 through 239, if the storage transport 6a cannot complete the storage operation, (e.g., because a human has mistakenly stored an object manually in the selected slot 4) a new slot 4 is selected, which may be in a different rack 2. At steps 241-246, if the runner transport process never receives a ready status telling it to pick up an object, runner transport 10a waits at its home position near the conveyor transports 16a, 16b.

TABLE 4A

| | | Receiving runner |
|---|---|---|
| 200 | Initialize: | attach shared memory |
| 201 | | attach message queues |
| 202 | | initialize controller |
| 203 | | move to home position |
| 204 | | if (any of the above fail) |
| 205 | | call Quarantine |
| 206 | | endif |
| 207 | | set emergency kill trap |
| 208 | | put PID into shared memory |
| 209 | | set Status = ready |
| 210 | Run: | while (receive from request queue != quit) |
| 211 | | move station distance |
| 212 | | if (successful) |
| 213 | | send ready status message to Station |
| 214 | | else |
| 215 | | send abort status message to Station |
| 216 | | call quarantine function |
| 217 | | endif |
| 218 | | receive status message from Station |
| 219 | | if (Status == ready) |
| 220 | | send request message to Rabbit |
| 221 | | while (Transfer not complete) |
| 222 | | move Aisle's receiving distance |
| 223 | | if (successful) |
| 224 | | send ready status message to Rabbit |
| 225 | | else |
| 226 | | send abort status message to Rabbit |
| 227 | | call Quarantine |
| 228 | | endif |
| 229 | | receive status message from Rabbit |
| 230 | | if (Status == ready) |
| 231 | | set Transfer = complete |
| 232 | | move to home position |
| 233 | | if (not successful) |
| 234 | | call Quarantine |
| 235 | | endif |
| 236 | | else |
| 237 | | call Replace Slot |
| 238 | | end request to new Aisle Number |
| 239 | | endif |
| 240 | | endwhile |
| 241 | | else |
| 242 | | move to home position |
| 243 | | if (not successful) |
| 244 | | call Quarantine |
| 245 | | endif |
| 246 | | endif |
| 247 | | endwhile |
| 248 | Quit: | detach shared memory |
| 249 | | detach message queues |
| 250 | | close controller port |
| 251 | | exit |
| 252 | Emergency: | call Emergency Kill |
| 253 | Restart: | reset emergency kill trap |

TABLE 4A-continued

| | Receiving runner |
|---|---|
| 254 | unset stop processing flag |

Table 4b lists the steps executed by runner transport 10a during retrieval (shipping) operations. In the exemplary embodiment, each runner transport 10a–10h alternates between executing storage operations to an assigned storage transport 6a–6h adjacent a first storage rack assembly 2a, and executing retrieval operations from a different storage transport 6a–6h adjacent a different rack 2b. Since the greatest delay in a storage or retrieval operation is the time when the runner transport is moving between the conveyor 16a and storage 6a transports, it is advantageous to schedule two operations (one storage, one retrieval) each time the runner 10a visits the conveyor transport 16a.

At step 310, the runner transport process checks whether there are any retrieval operations to perform in its retrieval operation queue 146. At step 311, the runner transport 10a moves to the location of the storage rack assembly 2a where its assigned storage transport 6a is located. At steps 312–317, the runner transport process reports the status of these steps. At step 318, the runner transport process awaits a status message from the storage transport process indicating that the storage transport 6a has successfully transferred an object 1 to the runner transport 10a.

At step 320, when the status message is received from the storage transport process, the runner transport process sends a message to the conveyor transport process. At step 321, the runner transport 10a moves to its home position (if not already there) and rotates 90 degrees to align its channel 48 with the channel 34a, 34b of the conveyor transport 16a. At steps 322–328, the runner transport process reports its status and awaits a status message from the conveyor transport process. At step 329, the runner transport process awaits a status message from the conveyor transport process indicating that the conveyor transport 16a has successfully removed the object from the runner transport 10a. When this status message is received, the runner transport channel 48 may be rotated 90 degrees at step 331, if it is to be immediately dispatched for another retrieval (shipping). In the exemplary embodiment, the runner transport will typically perform another storage operation, executing steps 210–247 after the retrieval, so it is not necessary to perform the rotation at step 331. If, however, there are no more storage operations to be performed, the rotation is desirable at step 331.

TABLE 4B

| | | Shipping Runner - (Runner #, tty #) |
|---|---|---|
| 300 | Initialize: | attach shared memory |
| 301 | | attach message queues |
| 302 | | initialize controllers |
| 303 | | move to home position |
| 304 | | if (any of the above fail) |
| 305 | |   call Quarantine |
| 306 | | endif |
| 307 | | set emergency kill trap |
| 308 | | put PID into shared memory |
| 309 | | set Status = ready |
| 310 | Run: | while (receive from request queue != quit) |
| 311 | |   move Aisle's shipping distance |
| 312 | |   if (successful) |
| 313 | |     send ready status message to Rabbit |
| 314 | |   else |
| 315 | |     send abort status message to Rabbit |
| 316 | |     call Quarantine |
| 317 | |   endif |
| 318 | |   receive status message from Rabbit |
| 319 | |   if (Status == ready) |
| 320 | |     send request message to Conveyor Rabbit |
| 321 | |     move to home position and rotate |
| 322 | |     if (successful) |
| 323 | |       send ready status message to Conveyor Rabbit |
| 324 | |     else |
| 325 | |       send abort status message to Conveyor Rabbit |
| 326 | |       call Request To Ship |
| 327 | |       call Quarantine |
| 328 | |     endif |
| 329 | |     receive status message from Conveyor Rabbit |
| 330 | |     if (Status == ready) |
| 331 | |       rotate toward home |
| 332 | |       if (not successful) |
| 333 | |         call Quarantine |
| 334 | |       endif |
| 335 | |     else |
| 336 | |       call Quarantine |
| 337 | |     endif |
| 338 | |   else |
| 339 | |     move to home position |
| 340 | |     if (not successful) |
| 341 | |       call Quarantine |
| 342 | |     endif |
| 343 | |   endif |
| 344 | | endwhile |
| 345 | Quit: | detach shared memory |
| 346 | | detach message queues |
| 347 | | close controller port |
| 348 | | exit |

TABLE 4B-continued

| | | |
|---|---|---|
| 349 | Emergency: | call Emergency Kill |
| 350 | Restart: | reset emergency kill trap |
| 351 | | unset stop processing flag |

Table 5 (steps 400–586) lists pseudocode describing the storage transport process. Respective storage transport processes control each storage transport 6a–6h.

Steps 400–409 are initialization steps which are performed when a storage transport 6a is brought online. Steps 411–489 are performed for each storage (receiving) operation. Steps 490–578 are performed during each retrieval (shipping) operation.

At step 410, the storage transport process checks whether there are any storage operation requests in its storage operation queue 140. At step 412, the storage transport 6a moves to its load position adjacent rack 8a. At step 414, the storage transport process awaits a status message from the runner transport process indicating that the runner transport 10a is in position for delivering an object. At step 417, the scanner 30 on the storage transport 6a scans the label 29 on the object case 60. If the label matches the label that was scanned in by the operator the process continues (Otherwise a human error has occurred) and at steps 418 and 419, the electromagnet assembly 32 is actuated towards the runner transport channel 48 and the magnet 33 is turned on. At step 422, the assembly 32 is actuated away from the runner transport channel 48, taking the object 1 with it. At step 424, a message is sent from the storage transport process to the runner transport process indicating successful receipt of the object.

At step 426, the storage transport 6a is actuated to the desired horizontal and vertical positions adjacent the selected slot 4 in storage rack assembly 2a. At step 427, the object handling assembly 74 of the storage transport 6a is rotated 90 degrees, to align the channels 34a, 34b with the slot 4. At step 429, the scanner 30 reads the slot label 28. At steps 430–446, if the slot label 28 does not match the desired slot label identified in the request message in queue 140, the storage transport 6a is moved to its home position and the system will again attempt to move the storage transport 6a to the desired slot 4. Upon arriving at the slot for the second time, the scanner 30 again reads the slot label 28. If a second mismatch occurs, the storage operation terminates and an alarm condition is set.

At steps 447–448, if the label 28 matches, and the slot 4 is empty, the assembly 32 is actuated towards the slot to push the object into the slot. If this step is executed successfully, the assembly 32 is moved out of the slot 4. At steps 456–460, a double check is performed. The object label 29 and the slot label 28 are scanned again to ensure the integrity of the inventory database. If the labels match the expected values for the labels, then the object data listed in table 1a is entered into the database.

At step 462, if the transfer to the slot is unsuccessful (e.g., if the object is dropped), an alarm condition is set. At step 468, if an object is found in the slot during execution of step 447, (e.g., due to human error or database corruption), then an alternate slot is selected.

At step 475, if the transfer from the runner transport 10 to the storage transport 6 was unsuccessful, an alarm condition is set. At step 478, if the storage transport 6 was unable to move to its loading position at step 413, an alarm condition is set. Either of these conditions usually indicates a mechanical problem.

At step 490, when the storage operation is complete, the storage transport process checks the retrieval operation queue 142. If any retrieval operation request messages are in the queue, the transport process begins the retrieval operation.

At step 491, the storage transport 6a is actuated to a position adjacent the desired slot 4, where it is to retrieve an object 1. At step 493, scanner 30 reads the label 28 at the slot and label 29 on the object case 60. At steps 494–512, if the label 28 read by scanner 30 does not match the expected value in the control message in queue 142, the storage transport 6a is moved to its home position and the system will again attempt to move the storage transport 6a to the desired slot 4. Upon arriving at the slot for the second time, the scanner 30 again reads the slot label 28. If a second mismatch occurs, the retrieval operation is terminated and an alarm condition is set.

At steps 513–515, if the object label 29 matches the expected value, the magnet 33 is turned on and the electromagnet assembly 32 moves into the slot 4. At steps 516–518, the object is pulled out of slot 4, into the storage channels 34a, 34b. At step 520–521, a message is sent from the storage transport process to the runner transport process indicating status, and the storage transport 6a moves to the unloading position adjacent runner transport 10a. At steps 524–525, the storage transport process awaits a status message from the runner transport process indicating that the runner transport 10a is in position and ready to receive an object 1.

At steps 526–527, when the status message has been received, the electromagnet assembly 32 is actuated to push the object into the channel 48 of the runner transport 10a. The assembly 32 is then withdrawn. At steps 531–536, a status message is sent to the runner transport process indicating that the transfer is complete. At step 534, a database transaction is made to identify that slot 4 is now empty, and can receive another object.

Steps 536–545 set alarm conditions if either of the above operations at steps 526 or 529 are unsuccessful. Steps 546–549 provide for the selection of an alternate runner transport if the selected runner transport process never returns a ready message at step 525. Steps 551–565 set alarm conditions if the above operations at steps 515, 518 or 521 are unsuccessful.

At steps 565–569, if the object label 29 read at step 513 does not match the object label expected, a message is sent to update the inventory database.

In the exemplary embodiment, each storage transport 6a–6h alternates between executing storage operations and retrieval operations. As described earlier, each runner transport 10a also alternates between storage (transferring an object to one storage transport 6) and retrieval (receiving an object from a different storage transport). Because none of the storage transports 6a receives objects from the same runner transport 10a that it delivers to, and none of the runner transports 10b receives objects from the same storage transport 6a that it delivers to, the storage and retrieval operations are pipelined. Each of the storage 6a–6h (or runner 10a–10h) transports can deliver an object while the respective runner (or storage) transport from which it receives is getting an object. Each of the storage 6a–6h (or runner 10a–10h) transports can receive an object while the respective runner (or storage) transport to which it delivers is disposing of an object.

TABLE 5

| | | Rabbit - (Aisle 190, tty #) |
|---|---|---|
| 400 | Initialize: | attach shared memory |
| 401 | | attach message queues |
| 402 | | initialize controllers |
| 403 | | move to home positions |
| 404 | | if(any of the above fail) |
| 405 | |   call Quarantine |
| 406 | | endif |
| 407 | | set emergency kill trap |
| 408 | | put PID into shared memory |
| 409 | | set Status = ready |
| 410 | Run: | while (receive from request queue != quit) |
| 411 | |   if (message in receiving queue) |
| 412 | |     move to load position |
| 413 | |     if (successful) |
| 414 | |       receive status message from Runner |
| 415 | |       if (Status == ready) |
| 416 | |         call Read Scanner |
| 417 | |         if (ECI == requested ECI) |
| 418 | |           turn on output, open grabber |
| 419 | |           move into Runner |
| 420 | |           if (successful) |
| 421 | |             turn off output, close grabber |
| 422 | |             move out of Runner |
| 423 | |             if (successful) |
| 424 | |               send ready status message to Runner |
| 425 | |               while (Transfer not complete) |
| 426 | |                 move horizontal, vertical, |
| 427 | |                 rotary to slot |
| 428 | |                 if (successful) |
| 429 | |                   call Read Scanner |
| 430 | |                   if (Slot != requested Slot) |
| 431 | |               move horizontal, vertical to home |
| 432 | |               if (successful) |
| 433 | |                 move horizontal, vertical |
| 434 | |                 to slot |
| 435 | |                 if (successful) |
| 436 | |                   call Read Scanner |
| 437 | |                   if (Slot != requested Slot) |
| 438 | |                     call Quarantine |
| 439 | |                 endif |
| 440 | |               else |
| 441 | |                 call Quarantine |
| 442 | |               endif |
| 443 | |             else |
| 444 | |               call Quarantine |
| 445 | |             endif |
| 446 | |           endif |
| 447 | |       if (no ECI in slot) |
| 448 | |         move into slot |
| 449 | |         if (successful) |
| 450 | |           turn on output, open grabber |
| 451 | |           move out of slot |
| 452 | |           if (successful) |
| 453 | |             turn off output, close |
| 454 | |             grabber |
| 455 | |             call Read Scanner |
| 456 | |             if (ECI == requested ECI |
| 457 | |             && Slot == requested Slot) |
| 458 | |               call Insert Plug Inv. |
| 459 | |               Transfer = complete |
| 460 | |             endif |
| 461 | |           else |
| 462 | |             call Quarantine |
| 463 | |           endif |
| 464 | |         else |
| 465 | |           call Quarantine |
| 466 | |         endif |
| 467 | |       else |
| 468 | |         call Replace Slot |
| 469 | |       endif |
| 470 | |             else |
| 471 | |               call Quarantine |
| 472 | |             endif |
| 473 | |           endwhile |
| 474 | |         else |
| 475 | |           call Quarantine for Rabbit & Runner |

TABLE 5-continued

```
476                endif
477              else
478                call Quarantine for Rabbit & Runner
479              endif
480            else
481              send abort status message to Runner
482              log error
483            endif
484          endif
485        else
486          send abort status message to Runner
487          call Quarantine
488        endif
489      endif
490      if (message in shipping queue)
491        move horizontal, vertical, rotary to slot
492        if (successful)
493          call Read Scanner
494          if (Slot != requested Slot)
495            move horizontal, vertical to home
496            if (successful)
497              move horizontal, vertical to slot
498              if (successful)
499                call Read Scanner
500                if (Slot != requested Slot)
501                  call Request To Ship
502                  call Quarantine
503                endif
504              else
505                call Request To Ship
506                call Quarantine
507              endif
508          else
509            call Request To Ship
510            call Quarantine
511          endif
512      endif
513      if (ECI == requested ECI)
514        turn on output, open grabber
515        move into slot
516        if (successful)
517          turn off output, close grabber
518          move out of slot
519          if (successful)
520            send request message to Runner
521            move to Runner load position
522            if (successful)
523              while (Transfer not complete)
524              receive status message from Runner
525              if (Status == ready)
526                move into Runner
527                if (successful)
528                  turn on output, open grabber
529                  move out of Runner
530                  if (successful)
531                    send ready status message
532                    to Runner
533                    turn off output,close grabber
534                    call Add Spare Slot
535                    Transfer = complete
536                  else
537                    call Request To Ship
538                    call Quarantine for Rabbit
539                    and Runner
540                  endif
541                else
542                  call Request To Ship
543                  call Quarantine for Rabbit
544                  and Runner
545                endif
546              else
547            call Select Runner
548            send request message to Runner
549          endif
550        endwhile
551              else
552                send abort status message to Runner
553                call Request To Ship
554                call Quarantine
555              endif
556            else
557              send abort status message to Runner
```

TABLE 5-continued

```
558                  call Request To Ship
559                  call Quarantine
560                  endif
561                else
562                  send abort status message to Runner
563                  call Request To Ship
564                  call Quarantine
565                endif
566              else
567                call Update Plug Inv. with found ECI
568                call Request To Ship
569              endif
570            else
571              call Request To Ship
572              call Quarantine
573            endif
574          endif
575          move to home position
576          if (not successful)
577            call Quarantine
578          endif
579        endwhile
580  Quit:     detach shared memory
581            detach message queues
582            close controller port
583            exit
584  Emergency: call Emergency Kill
585  Restart:   reset emergency kill trap
586            unset stop processing flag
```

Table 6 lists pseudocode describing the conveyor transport process that operates the conveyor transports 16a-16d. There is one process for each transport 16a-16d. Steps 600-609 describe the initialization process that is performed when the system is started or when a new conveyor transport is brought online.

At step 610, the conveyor transport process checks whether there are any retrieval operations to perform in its retrieval operation queue 150. If there are, then the conveyor transport 16a is moved to the position adjacent the runner transport 10a. The object handling assembly 74 of the conveyor transport is rotated 180 degrees, so that the channels 34a, 34b are aligned with the opening 14. At step 613, the conveyor transport process awaits a status message from the runner transport process that the runner transport 10a is ready to transfer an object 1 to the conveyor transport 16a. At step 615, the scanner 30 on the conveyor transport reads the object label 29, to ensure that the runner transport 10a has the correct object. At steps 616-621, the electromagnet assembly 32 of the conveyor rabbit is actuated towards the runner transport and the magnet 33 is turned on. Assembly 32 is then withdrawn from the runner transport 10a, pulling the object into the channels 34a, 34b of the conveyor transport 16a.

At step 625, an opening 14 in the conveyor rack assembly 12 is selected. At step 626-627, the conveyor transport 16a is moved to the location of the selected opening 14 and the object handling assembly 74 of the conveyor transport 16a is rotated 180 degrees. The object storage channels 34a, 34b are now aligned with the opening 14. At step 629, the scanner 30 of the conveyor transport 16a reads the label 28a of the opening and also scans to determine whether an object is already present in the selected slot (e.g., an object placed there by human error). At step 632-634, if the label 28a matches the expected value of the label 28a, and the slot is empty, the electromagnet assembly 32 of the conveyor transport is actuated forward to push the object into the opening 14, the magnet 33 is turned off, and the assembly 32 is withdrawn from the opening 14.

At step 635, a message is sent to update the inventory database (as described in table 1a) to reflect that the object 1 has been delivered to shipping.

Steps 641-675 describe conveyor transport process responses to error conditions, which are similar to the responses described above for the storage transport 6a. If the conveyor transport 16a is unable to deliver the object 1 into the conveyor rack assembly 12, an alarm condition is set. If the conveyor transport is unable to receive the object from the runner transport for any reason, the alarm is set, and a message is sent to the respective runner transport process.

The steps of the conveyor transport process during storage operations are similar. The conveyor transport checks its queue 148 for pending storage operations. When an operation is identified, the conveyor transport 16a moves to the location of the opening 14 in which an operator has placed the object 1 and rotates 180 degrees to align its storage channels 34a, 34b with the opening 14. The scanner 30 of the conveyor transport reads the slot label 28a and the object label 29 of the object 1 in the slot. If either label does not match the values defined by the message in queue 148, or if the opening 14 is empty (e.g., due to human error), an alarm condition is set. Otherwise, the electromagnet assembly 32 of the conveyor transport 16a is actuated towards the opening 14 and the magnet 33 is turned on. The object is pulled into channels 34a, 34b and the assembly 32 is withdrawn, pulling the object 1 out of the opening. The magnet 33 is then turned off.

The conveyor transport 16a moves to the end of the track 8a-8h to meet the runner transport to which it will deliver the object 1. The object handling assembly 74 of the conveyor transport 16a rotates 180 degrees to align channels 34a, 34b with the channel 48 of the runner transport 10a. A status message is sent to the runner transport process which controls the selected runner transport 10a to which the conveyor transport 16a will deliver the object 1. The conveyor transport will await a status message from the runner transport process identifying that runner transport 10a is ready to receive.

When the conveyor transport 16a receives the status message, the runner transport 10a is ready. The electromagnet assembly 32 of the conveyor transport 16a is actuated towards the runner transport 10a, pushing the object into the channel 48 of the runner transport 10a. The assembly 32 is then withdrawn, leaving the object 1 in the runner transport 10a. The conveyor transport process sends a status message to the runner transport process that the transfer is complete.

TABLE 6

Conveyor Rabbit - (tty #)

| | | |
|---|---|---|
| 600 | Initialize: | attach shared memory |
| 601 | | attach message queues |
| 602 | | initialize controllers |
| 603 | | move to home positions |
| 604 | | if (any of the above fail) |
| 605 | |   call Quarantine |
| 606 | | endif |
| 607 | | set emergency kill trap |
| 608 | | put PID into shared memory |
| 609 | | set Status = ready |
| 610 | Run: | while (receive from request queue != quit) |
| 611 | |   move horizontal, vertical to Runner and rotate |
| 612 | |   if (successful) |
| 613 | |     receive status message from Runner |
| 614 | |     if (Status == ready) |
| 615 | |       call Read Scanner |
| 616 | |       if (ECI == requested ECI) |
| 617 | |         turn on output, open grabber |
| 618 | |         move into Runner |
| 619 | |         if (successful) |
| 620 | |           turn off output, close grabber |
| 621 | |           move out of Runner |
| 622 | |           if (successful) |
| 623 | |             Goodslot = FALSE |
| 624 | |             while (not Goodslot) |
| 625 | |             call Select Shipping Slot |
| 626 | |             move horizontal,vertical to |
| 627 | |             shipping slot and rotate |
| 628 | |             if (successful) |
| 629 | |               call Read Scanner |
| 630 | |               if (proper slot and slot is empty) |
| 631 | |                 Goodslot = TRUE |
| 632 | |                 move into slot |
| 633 | |                 if (successful) |
| 634 | |                   turn on output, open grabber |
| 635 | |                   call Update Shipping Inventory |
| 636 | |                   if (Last Flag == true) |
| 637 | |                     send request message to station |
| 638 | |                   endif |
| 639 | |                   move out of slot |
| 640 | |                   if (successful) |
| 641 | |                     turn off output, close grabber |
| 642 | |                   else |
| 643 | |                     call Quarantine |
| 644 | |                   endif |
| 645 | |                 else |
| 646 | |                   call Quarantine |
| 647 | |                 endif |
| 648 | |               else |
| 649 | |                 continue while loop |
| 650 | |               endif |
| 651 | |             else |
| 652 | |               call Quarantine |
| 653 | |             endif |
| 654 | |             endwhile |
| 655 | |           else |
| 656 | |             send abort message to Runner |
| 657 | |             call Quarantine |
| 658 | |           endif |
| 659 | |         else |
| 660 | |           send abort message to Runner |
| 661 | |           call Quarantine |
| 662 | |         endif |
| 663 | |       else |
| 664 | |         send abort message to Runner |
| 665 | |         log error |
| 666 | |       endif |
| 667 | |     endif |
| 668 | |   else |
| 669 | |     send abort message to Runner |
| 670 | |     call Quarantine |
| 671 | |   endif |
| 672 | |   move to home positions |
| 673 | |   if (not successful) |
| 674 | |     call Quarantine |
| 675 | |   endif |

TABLE 6-continued

| 676 | | endwhile |
| 677 | Quit: | detach shared memory |
| 678 | | detach message queues |
| 679 | | close controller port |
| 680 | | exit |
| 681 | Emergency: | call Emergency Kill |
| 682 | Restart: | reset emergency kill trap |
| 683 | | unset stop processing flag |

Additional processes are provided to operate the operator terminals 20. Table 7 lists pseudocode for software which may be used for storage in an alternate embodiment of the invention, in which storage (receiving) operators manually load the objects 1 into the channel 48 of the runner transports 10a, and the conveyor transports are only used during retrieval (shipping) operations. Some of the steps described in table 7 are not used in the exemplary embodiment; these steps are identified below.

At steps 700–701, the receiving station terminal 20a is initialized. At step 703, the receiving station operator is prompted to input the object category and the manufacturing date. At step 705, a determination is made whether this object category is handled by the ASRS. It is contemplated that some materials will not be stored in the ASRS (due to extraordinary size, safety considerations, or unique environmental requirements). The receiving station process will notify the operator if the object belongs to a category which should not be stored in the ASRS.

Steps 708–720 are unique to this alternate embodiment. At steps 708–711, the receiving station process sends a message requesting that a runner transport be moved into a position accessible by the operator. When the runner 10a is in position, the operator is notified that the runner transport 10a is ready to receive. A safety door is opened so that the operator can place the object on the runner channel 48. Status messages are sent when each task is complete.

In the exemplary embodiment, the operator is only required to place the object in one of the openings 14 of the conveyor rack assembly 12. When the operator scans in the opening label 28a and the object label 29 with a hand held scanner 62, these data are provided to the conveyor transport process by a message in queue 148.

TABLE 7

| | | Receiving Station - (station #) |
|---|---|---|
| 700 | Initialize: | attach shared memory |
| 701 | | attach message queues |
| 702 | Run: | while (function != quit) |
| 703 | | input ECI, Manufactured Date |
| 704 | | call Plug Reference |
| 705 | | if (plug goes in AWS) |
| 706 | | call Select Spare Slot |
| 707 | | while (Transfer not complete) |
| 708 | | call Select Runner |
| 709 | | send request message to Runner |
| 710 | | receive status message from Runner |
| 711 | | if (Status == ready) |
| 712 | | call Light And Unlock Door |
| 713 | | wait for key press |
| 714 | | call Lock And Unlight Door |
| 715 | | send ready status message to Runner |
| 716 | | Transfer = complete |
| 717 | | else |
| 718 | | send abort status message to Rabbit |
| 719 | | from Runner |
| 720 | | endif |
| 721 | | endwhile |
| 722 | | else |
| 723 | | do normal Picscan processing |
| 724 | | endif |
| 725 | | endwhile |
| 726 | Quit: | detach shared memory |
| 727 | | detach message queues |
| 728 | | exit |

Note: Use the alarm function to kill the receive status message from runner if nothing comes in a reasonable amount of time.

Table 8 lists pseudocode for the process which operates a shipping terminal 20 b. At step 734, the shipping terminal process receives a message from a conveyor transport process that the conveyor transport 16 has placed an object 1 in an opening 14 of rack 12. At steps 735–742, notifications are displayed telling the operator that an object has arrived, furnishing data which include object location, and order.

TABLE 8

| | | Shipping Station - (Station #) |
|---|---|---|
| 730 | Initialize: | attach shared memory |
| 731 | | attach message queues |
| 732 | | set Station Status to up |
| 733 | Run: | while (function != quit) |
| 734 | | receive request message from Conveyor Rabbit |
| 735 | | flash screen and wait for key press |
| 736 | | if (key == next shipping notice) |
| 737 | | display shipping notice with slot locations |
| 738 | | illuminate appropriate shipping slots |
| 739 | | wait for key press |
| 740 | | call Update Shipping Inventory to clear slots |
| 741 | | turn off lights |
| 742 | | else if (key == stop sending notices) |
| 743 | | set Station Status to down |
| 744 | | else if (key == quit) |
| 745 | | set Station Status to down |
| 746 | | send current request message back to queue |
| 747 | | endif |
| 748 | | endwhile |
| 749 | Quit: | detach shared memory |
| 750 | | detach message queues |

TABLE 8-continued

| | |
|---|---|
| 751 | exit |

Table 9 describes the selection processes which are discussed above with reference to FIGS. 6a–6c.

TABLE 9

| | Shipping Notice Handler | |
|---|---|---|
| 760 | Initialize: | attach shared memory |
| 761 | | attach message queues |
| 762 | Run: | while (function != quit) |
| 763 | | input ECI, Shipping Notice #, Last Flag, Station # |
| 764 | | call Select Plug Inventory |
| 765 | | call Select Runner |
| 766 | | send request message to Rabbit |
| 767 | | endwhile |
| 768 | Quit: | detach shared memory |
| 769 | | detach message queues |
| 770 | | exit |

Table 10 lists pseudocode for a process which is periodically run to perform a complete integrity check of the inventory database. This process is typically run between shipping/receiving operator shifts. A respective copy of the process is executed for each storage transport 6a–6h.

At steps 779–791, the storage transport is actuated to the first slot 4 in its respective rack 2. Any corner slot 4 may be selected as the first slot. The scanner 30 is activated to read the slot label 28 and the object label 29, if there is an object 1 in the slot 4. If the object label 29 does not match the value stored in the database (table 1a data), a message is sent to correct the data in the inventory and the error is logged. When this is completed, the transport 6a is moved to the next slot. The order of scanning may be to scan each slot in the row and repeat the row scanning operation for every other row; or each slot in the same column may be scanned and the column scanning operation repeated for every other column.

TABLE 10

| | Reinventory Rabbit | |
|---|---|---|
| 771 | Initialize: | attach shared memory |
| 772 | | initialize controllers |
| 773 | | move to home position |
| 774 | | if (any of the above fail) |
| 775 | | call Quarantine |
| 776 | | endif |
| 777 | | set emergency kill trap |
| 778 | | put PID into shared memory |
| 779 | Run: | for (every slot in shelf) |
| 780 | | move horizontal, vertical to slot |
| 781 | | if (successful) |
| 782 | | call Read Scanner |
| 783 | | call Select Plug Inventory |
| 784 | | if (ECI != stored ECI) |
| 785 | | call Update Plug Inventory |
| 786 | | log error |
| 787 | | endif |
| 788 | | else |
| 789 | | call Quarantine |
| 790 | | endif |
| 791 | | endfor |
| 792 | Quit: | detach shared memory |
| 793 | | close controller port |
| 794 | | exit |
| 795 | Emergency: | call Emergency Kill |
| 796 | Restart: | reset emergency kill trap |
| 797 | | unset stop processing flag |

Table 11 lists exemplary components which may be used in the construction of an apparatus in accordance with the invention. Similar or equivalent components may also be used.

TABLE 11

| Exemplary Components (designated by reference numerals) | |
|---|---|
| Track (8) | Gleason Power Track |
| | Part #101P-11-1.4 |
| | Charlie H. Preson Co. |
| | Maple Shade, NJ |
| Bearing (86,88) | Eccentric Bearing Unit |
| | Part 30-103 |
| | Item Products, Inc |
| | Houston, TX |
| Timing belt (43) | Part # 31-032-1 |
| | Item Products, Inc. |
| Scanner (30) | Model #SP300 |
| | Computer Identics |
| Controller (70)/ Motor (42) | Motor Sx57-102, Sx83-135, and SxIO6-172; |
| | Controller Sx-6, Sx-8 |
| | Compumotor, Inc. |
| Magnet (33) | Model # KE-3E |
| | Kanetsu Kogyo Co. |
| Decoder Box (104) | Scan Star 240 |
| | Computer Identics |
| CPU (18) | AT&T 6386 |
| DBMS | Ingres |
| | ASK/Ingres Co. |

Figure 8A:
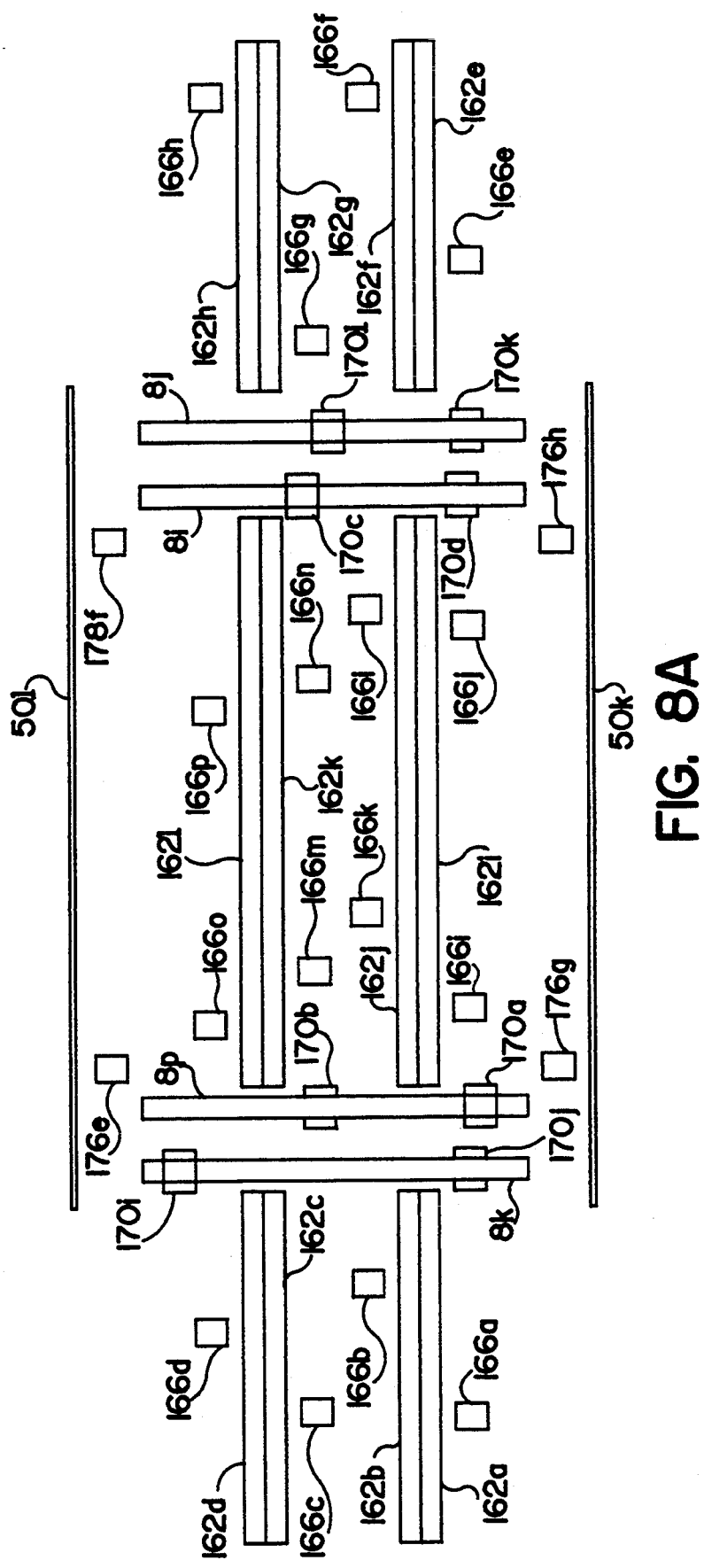
FIGS. 8a and 8b are plan views of alternate embodiments of the invention shown in FIG. 1.

It is understood by those skilled in the art that many variations of the exemplary embodiment described may be adapted to different user requirements. FIG. 8a shows a further exemplary embodiment in which the configuration is modified to efficiently use a long, narrow warehouse space. The basic configuration as shown in FIG. 1 (rack assemblies 162a–162h, storage transports 166a–166h, runner transports 170a–170h, conveyor transports 176e–176h) is included. In addition, further elongated storage rack assemblies 2i–2l, storage transports 166i–166p, runner transports 170i–170p (partially shown) and their associated tracks (e.g., 8i–8p) are added. Elongated tracks 50k, 50l allow the conveyor transports 176e–176h to reach the additional runner transports. Storage transports 166i and 166j are each able to move along the length of storage rack assembly 2i so long as they do not cross over one another.

Figure 8B:
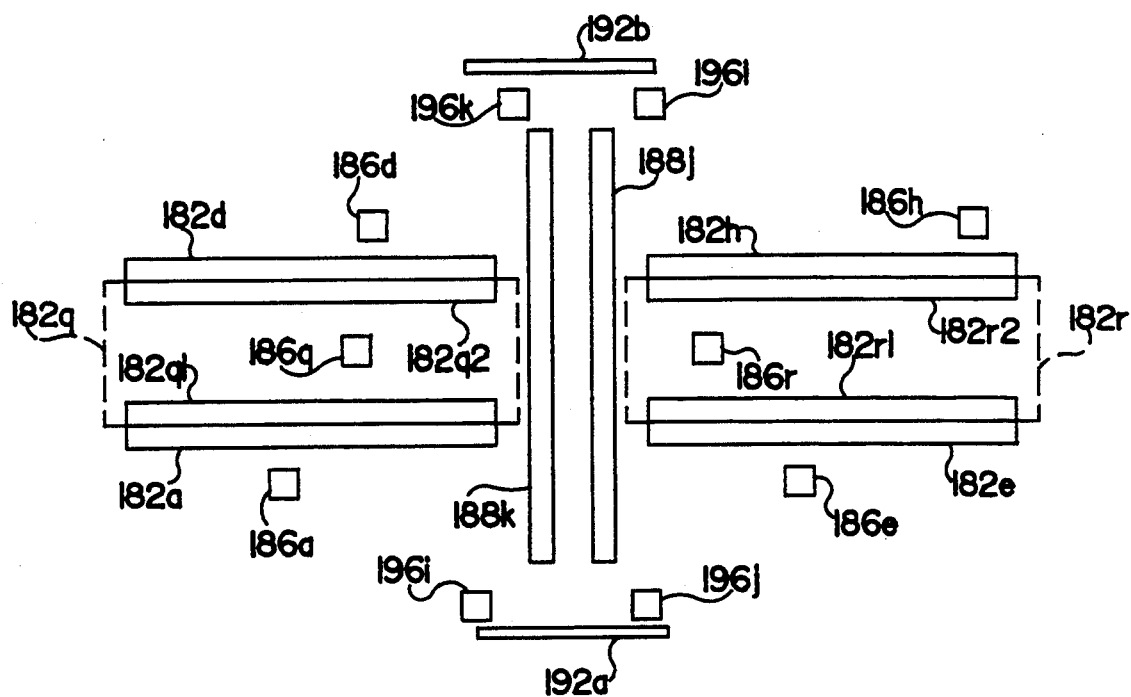

FIG. 8b shows another alternate embodiment in which the number of storage transports is reduced. This configuration includes storage transports 186a–186r, storage rack assemblies 182a–182r, runner tracks 188j–188k, conveyor transports 196i–196l, conveyor rack assemblies 192a, 192b and runner transports (not shown).

A storage rack assembly 182q includes racks $182q_1$ and $182q_2$ on opposite sides of the storage transport 186q. Similarly, storage rack assembly 182r includes racks 182r₁ and 182r₂ on opposite sides of transport 186r. A single storage transport 186q accesses both storage racks 182q₁ and 182q₂. Each storage transport 186q, 186r is able to rotate 180 degrees to access storage racks within its respective storage rack assembly on both sides of the aisle.

While the invention has been described in terms of exemplary embodiments, it is contemplated that it may be practiced as outlined above with modifications within the spirit and scope of the appended claims.

What is claimed:

1. An automated system for storing and retrieving objects which are assigned to object categories, the system comprising:
   a plurality of storage rack assemblies, each storage rack assembly having a plurality of slots sized for storing said objects;
   means for generating storage operation requests and retrieval operation requests;
   control means responsive to said storage operation requests and retrieval operation requests for generating first, second, third and fourth control signals;
   a plurality of independently movable storage transports, each storage adjacent a respective one storage rack assembly in response to said first control signals for transferring an object to any one of said plurality of slots in that respective storage rack assembly and movable in response to said second control signals for retrieving an object from any one of said plurality of slots in that respective storage rack assembly, each storage transport including object handling means for receiving, holding and delivering one of said objects, said plurality of storage transports storing said objects in their respective storage rack assemblies;
   a plurality of independently movable runner transports which deliver objects to said plurality of storage transports in response to said third control signals and receive objects from said plurality of storage transports in response to said fourth control signals, each of said runner transports including means for holding one of said objects, wherein:
   a first one of the runner transports provides an object to a first one of the storage transports during a first storage operation and receives an object from a second one of the storage transports during a first retrieval operation, and
   a second one of the runner transports provides an object to the second storage transport during a second storage operation and receives an object from the first storage transport during a second retrieval operation.

2. A system in accordance with claim 1, in which said control means include storage slot selection means for generating slot selection signals selecting a respective slot within a respective one of the storage rack assemblies into which each respective object is stored, to distribute objects assigned to any one object category within each respective storage rack assembly in accordance with a predetermined ordered list of slots, wherein said first control signals include said slot selection signals.

3. A system in accordance with claim 1, in which said control means include:
   retrieval selection means for providing retrieval selection signals selecting one of said plurality of storage rack assemblies from which to retrieve a respective object assigned to a desired category, wherein a preference is given to selecting the one of said plurality of rack assemblies in which objects which have been stored the longest; and
   retrieval slot selection means for providing signals selecting one of said plurality of slots within said selected storage rack assembly from which to retrieve a respective object assigned to a desired category, wherein a preference is given to selecting the one of said plurality of slots in which all object has been stored the longest, wherein said second control signals include said retrieval selection signals and said retrieval slot selection signals.

4. A system in accordance with claim 1, wherein at least two of said plurality of storage transports store at least one object and retrieve at least one object simultaneously.

5. A system as set forth in claim 1, in which said control means include means for generating fifth control signals in response to storage operation requests and sixth control signals in response to retrieval operation requests, the system further comprising:
   a plurality of conveyor rack assemblies, each of said conveyor rack assemblies having a plurality of openings sized for holding said objects and arranged in a further plurality of horizontal rows and a further plurality of vertical columns;
   a plurality of independently and simultaneously movable conveyor transports adjacent said conveyor rack assemblies, each conveyor transport including object handling means for transferring objects from said conveyor rack assemblies to said plurality of runner transports in response to said fifth control signals and transferring objects from said plurality of runner transports to said conveyor rack assemblies in response to said sixth control signals;
   wherein objects are transferred from one of said conveyor rack assemblies to one of said storage rack assemblies by way of any one of said conveyor transports adjacent said one conveyor rack assembly, one of said runner transports and one of said storage transports, and objects are transferred from said one storage rack assembly to said one conveyor rack assembly by way of said one storage transport, another one of said plurality off runner transports and any one of said plurality of conveyor transports adjacent said one conveyor rack assembly.

6. A system in accordance with claim 5, in which the system includes for each conveyor transport a respective horizontal actuating motor and a respective timing belt which couples said conveyor transport to its respective horizontal actuating motor, and each conveyor transport includes:
   second and third timing belts;
   a second motor coupled by said second timing belt to said object handling means for actuating said object handling means in a vertical direction;
   a third motor coupled by said third timing belt to said third motor for actuating said electromagnet towards and away from said slot, and for actuating said electromagnet towards and away from said runner transport;
   a fourth motor for rotating said object handling means by an angle of 180 degrees in a horizontal plane.

7. A system in accordance with claim 1, in which said objects have object labels, each of said plurality of slots has a slot label, and said plurality of storage transports each include optical scanning means for reading said object labels and slot labels, and said control means include:
- storage means for storing data representing the respective object label and respective slot label of each respective object;
- means for comparing the object label of each object stored to the data in said storage means representing said object label;
- means for comparing the slot label of the respective slot into which each object is stored to the data in said storage means representing said slot label; and
- means for providing termination signals to said storage transport for terminating a storage operation unless both the object label of the object being stored and the slot label of the respective slot match the respective data stored in said storage means which represent said object label and slot label.

8. A system in accordance with claim 1, in which said storage rack assembly selection means include:
- means for assigning to each of said object categories an ordered array of predetermined sequence values, said array including one sequence value for each storage rack assembly;
- means for selecting successive storage rack assemblies for storing objects within each object category according to the order of said sequence values within the respective array for that object category.

9. A system in accordance with claim 1, in which each storage transport includes object handling means comprising:
- a holder which holds said objects;
- an optical scanner which reads bar code labels;
- a movable electromagnet which pulls an object into said holder and which pushes said object into a slot;
- a controller which turns on said electromagnet and said scanner when pulling said object into said holder, and which turns on said scanner and turns off said electromagnet when pushing said object into a slot.

10. A system in accordance with claim 9, in which the system includes for each storage transport a respective horizontal actuating motor and a respective timing belt which couples said storage transport to its respective horizontal actuating motor, and each storage transport includes:
- second and third timing belts;
- a second motor coupled by said second timing belt to said object handling means for actuating said object handling means in a vertical direction;
- a third motor coupled by said third timing belt to said third motor for actuating said electromagnet towards and away from said slot, and for actuating said electromagnet towards and away from said runner transport;
- a fourth motor for rotating said object handling means in a horizontal plane.

11. A system in accordance with claim 1, wherein each respective runner transport provides objects to a respective first group of storage transports within said plurality of storage transports and receives objects from a respective second group of storage transports from said plurality of storage transports.

12. An automated system for storing and retrieving objects according to claim 1, wherein each of the plurality of independently movable runner transports includes:
- a runner holder for holding one of said objects;
- means for rotating said runner holder by a desired angle to position said runner holder for receiving or delivering an object; and
- means for actuating said runner transport between a position for receiving an object and a position for delivering said object; and each of the plurality of independently movable storage transports includes:
- a storage holder which holds said objects;
- a movable assembly having an electromagnet;
- means for actuating said storage holder and assembly vertically and horizontally to a position for aligning said storage holder and assembly with the runner holder of one of said runner transports;
- means for rotating said storage holder and said assembly to an angular position for aligning said storage holder with said runner holder;
- means for actuating said assembly to electromagnetically engage an object to move said object horizontally into said storage holder when receiving said object from the runner holder of said one runner transport; and
- means for actuating said assembly to push said object out of said storage holder and into the runner holder when delivering said object to said one runner transport.

13. A system in accordance with claim 12, further comprising:
a plurality of independently movable conveyor transports, each conveyor transport including:
- a conveyor holder which holds said objects;
- a movable conveyor assembly having an electromagnet;
- means for actuating said conveyor assembly and conveyor holder vertically and horizontally to a position for aligning said conveyor holder and assembly with the runner holder of any one of said runner transports;
- means for rotating said holder and said electromagnet to an angular position for aligning said conveyor holder with said runner holder;
- means for actuating said conveyor assembly to electromagnetically engage an object to move said object horizontally into said conveyor holder when receiving said object from the runner holder of said one runner transport; and
- means for actuating said conveyor assembly to push said object out of said conveyor holder and into the runner holder of a further one of said runner transports, wherein said objects are transferred between said plurality of conveyor transports and said plurality of storage transports by way of said plurality of runner transports.

14. In an automated system for storing and retrieving objects, said system including a plurality of storage rack assemblies, a plurality of independently movable storage transports, and a plurality of independently movable runner transports, a method for transferring objects between said runner transports and said storage rack assemblies, the method comprising the steps of:
- moving each storage transport adjacent to a respective one storage rack assembly for transferring an object to any one of said plurality of slots in that respective storage rack assembly;

moving each storage transport for retrieving an object from any one of said plurality of slots in the respective storage rack assembly;

transferring a first object from a first one of the runner transports to a first one of the storage transports during a first storage operation;

transferring a second object from a second one of the runner transports to a second one of the storage transports during a second storage operation, transferring a third object from the first storage transport to the second runner transport during a first retrieval operation: and transferring a fourth object from second storage transport to the first runner transport during a second retrieval operation.

15. A method in accordance with claim 14, wherein at least two of said plurality of storage transports store at least one object and retrieve at least one object simultaneously.

16. A method in accordance with claim 14, wherein objects are transferred from one of said conveyor rack assemblies to one of said storage rack assemblies by way of any one of said conveyor transports adjacent to said one conveyor rack assembly, one of said runner transports and one of said storage transports, and objects are transferred from said one storage rack assembly to said one conveyor rack assembly by way of said one storage transport, another one of said plurality of runner transports and any one of said plurality of conveyor transports adjacent to said one conveyor rack assembly.

17. A method in accordance with claim 14, in which each runner transport transfers objects to a respective first group of storage transports within said plurality of storage transports and receives objects from a respective second group of storage transports within said plurality of storage transports.

* * * * *